(12) United States Patent
Alexander et al.

(10) Patent No.: US 12,384,286 B2
(45) Date of Patent: Aug. 12, 2025

(54) CARGO UNLOADER FOR A VEHICLE

(71) Applicant: GM Global Technology Operations LLC, Detroit, MI (US)

(72) Inventors: Paul W. Alexander, Ypsilanti, MI (US); Jesus Anthony Bernal, Farmington Hills, MI (US); Eric James Bontrager, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 446 days.

(21) Appl. No.: 18/163,993

(22) Filed: Feb. 3, 2023

(65) Prior Publication Data

US 2024/0262274 A1 Aug. 8, 2024

(51) Int. Cl.
*B60P 1/00* (2006.01)

(52) U.S. Cl.
CPC ................................. *B60P 1/006* (2013.01)

(58) Field of Classification Search
None
See application file for complete search history.

(56) References Cited

U.S. PATENT DOCUMENTS

| | | | |
|---|---|---|---|
| 3,443,703 A | 5/1969 | Matsumoto | |
| 3,578,186 A | 5/1971 | Thomas | |
| 4,015,727 A | 4/1977 | Rezac | |
| 4,231,695 A | 11/1980 | Weston | |
| 4,629,390 A | 12/1986 | Burke | |
| 4,842,471 A | 6/1989 | Hodgetts | |
| 5,340,266 A | 8/1994 | Hodgetts | |
| 5,915,911 A | 6/1999 | Hodgetts | |
| 6,033,179 A | 3/2000 | Abbott | |
| 8,033,776 B2 | 10/2011 | Calhoun | |
| 9,738,201 B2 | 8/2017 | Butterfield | |
| 11,623,830 B1 * | 4/2023 | Hall | E04B 1/35 414/495 |
| 11,926,201 B1 * | 3/2024 | Lillo | G07C 5/0825 |
| 2004/0178671 A1 | 9/2004 | Smith | |
| 2007/0264111 A1 | 11/2007 | Cooper | |

(Continued)

FOREIGN PATENT DOCUMENTS

CN 217048408 U 7/2022

*Primary Examiner* — Saul Rodriguez
*Assistant Examiner* — Ashley K Romano
(74) *Attorney, Agent, or Firm* — Vivacqua Crane, PLLC

(57) ABSTRACT

A tension-loaded drive mechanism ("mechanism") is provided for a cargo unloader. The drive mechanism includes a compressor for increasing the pressure of a fluid. The drive mechanism further includes multiple bladders fluidly connected to the compressor to receive the fluid from the compressor and expand in a rearward direction along a longitudinal axis of a cargo bed. The mechanism further includes a strap system having multiple straps attached to each bladder. The strap system further includes multiple spools configured to apply a compression counter force via the straps to the associated bladders, such that the compression counter force increases the pressure of the fluid in the associated bladders to a predetermined drive pressure threshold. The spools are further configured to dispense an associated one of the straps at a predetermined stepped payout rate such that the associated bladders apply a drive force associated with the predetermined drive pressure threshold.

20 Claims, 10 Drawing Sheets

(56) References Cited

U.S. PATENT DOCUMENTS

| | | | |
|---|---|---|---|
| 2016/0264031 A1* | 9/2016 | Weldy | B60P 1/027 |
| 2017/0246975 A1* | 8/2017 | Weldy | B60G 17/027 |
| 2019/0255981 A1* | 8/2019 | Malmassari | B60P 1/60 |
| 2021/0070210 A1* | 3/2021 | Albright | B60P 1/36 |
| 2023/0046293 A1* | 2/2023 | Nielsen | B60P 1/52 |
| 2023/0105967 A1* | 4/2023 | Green | B65G 63/004 15/104.03 |
| 2024/0131976 A1* | 4/2024 | Minjeur | B60P 1/43 |

* cited by examiner

CARGO UNLOADER FOR A VEHICLE

INTRODUCTION

The present disclosure relates to cargo space of vehicles, and more particularly to a cargo unloader for unloading or accessing cargo within the cargo space of a vehicle.

Automotive manufacturers are continuously investigating systems and accessories for improving the usability and versatility of truck beds. These truck beds can have a substantial amount of cargo capacity for transporting various types of cargo (e.g., gravel, topsoil, sand, stones, mulch, other landscaping and/or construction materials and equipment, large furniture, appliances, and the like). Occupants may climb into the truck bed and use shovels, ramps, hand carts, dollies, and the like to unload the cargo from the truck bed. In other examples, a sheet of fabric, flat plywood, or other carriers may first be laid into the truck bed, with certain cargo (e.g., gravel, topsoil, sand, stones, mulch, bricks, lumber, logs, etc.) being loaded onto the carrier. To remove the cargo, the occupant may use a chain, rope, or other pulling device to attach the carrier to a tree or fixed post and then drive the truck forward to remove the carrier and the cargo from the truck bed. However, a tree or other fixed post may not be available at or proximal to the destination of the cargo. In addition, the chain, rope, or other pulling device may have been removed from the vehicle (e.g., to be used for another purpose) and no longer not available to the occupant.

Thus, while the current carriers achieve their intended purpose, there is a need for a new and improved cargo unloader that addresses these issues.

SUMMARY

According to several aspects, a cargo unloader ("unloader") of a vehicle includes a tension-loaded drive mechanism ("drive mechanism") with a compressor for increasing the pressure of a fluid. The drive mechanism further includes multiple bladders, which are fluidly connected to the compressor and configured to receive the pressurized fluid from the compressor. Each bladder is configured to expand in a rearward direction along a longitudinal axis of a cargo bed, in response to the associated bladder receiving the fluid from the compressor. The drive mechanism further includes a strap system having straps attached to each bladder. The strap system further includes multiple spools configured to apply a compression counter force via the straps to the associated bladders in a forward direction opposite to the rearward direction. The compression counter force increases the pressure of the fluid in the associated bladders to a predetermined drive pressure threshold. The spools are further configured to dispense an associated one of the straps at a predetermined stepped payout rate, such that the associated bladders expand in the rearward direction to transmit a drive force associated with the predetermined drive pressure threshold. The cargo unloader further includes a plow attached to the bladders and configured to transmit the drive force from the bladders to cargo positioned in the cargo bed. The plow moves the cargo in the rearward direction, in response to the bladders expanding in the rearward direction.

In one aspect, the plow is not attached directly to the cargo bed, and the cargo bed does not have an associated fastener that is capable of being fouled by the cargo.

In another aspect, the plow includes a primary panel having a forward face attached to the bladders and a rearward face capable of contacting the cargo to move the cargo in the rearward direction in response to the bladders expanding in the rearward direction. The plow further includes a pair of sub-panels slidably attached to the primary panel and configured to move between a lower position and an upper position to clear a pair of wheel wells when the plow moves in the rearward direction.

In another aspect, the cargo unloader further includes a dead man switch electrically connecting a power supply to the compressor.

According to several aspects, a tension-loaded drive mechanism ("drive mechanism") for a cargo unloader includes multiple bladders fluidly connected to a compressor and configured to receive a fluid from the compressor. Each bladder is configured to expand in a rearward direction along a longitudinal axis of a cargo bed, in response to the associated bladder receiving the fluid from the compressor. The cargo unloader further includes a strap system having multiple straps attached to each bladder. The strap system further includes multiple spools configured to apply a compression counter force via the straps to the associated bladders in a forward direction opposite to the rearward direction of the expanding bladders. The compression counter force increases the pressure of the fluid in the associated bladders to a predetermined drive pressure threshold, and the spools are further configured to dispense an associated one of the straps at a predetermined stepped payout rate, such that the associated bladders expand in the rearward direction to transmit a drive force associated with the predetermined drive pressure threshold. A plow transmits the drive force from the bladders to a cargo positioned in the cargo bed to move the cargo in the rearward direction, in response to the bladders expanding in the rearward direction.

In one aspect, each bladder includes an accordion bellows having a forward end attached to a forward panel assembly, which is in turn mounted to a forward end of the cargo bed. Each accordion bellows further includes a rear end opposite to the forward end. Each accordion bellows further includes a pair of sides extending between the forward and rear ends. Each bladder further includes a cap having a forward surface attached to the rear end of the accordion bellows. The cap further has a rear surface attached to a plow for moving cargo in the rearward direction. The cap further has a pair of opposing lateral ends, with one or more of the straps attached to each opposing lateral end of the cap to transmit the compression counter force to the associated accordion bellows. Each strap further transmits a lateral force to the sides of the accordion bellows in a lateral direction, with the lateral direction being transverse to the longitudinal axis of the cargo bed.

In another aspect, each bladder further includes multiple guide rings attached to the sides of the accordion bellows and spaced from one another. Each guide ring is configured to receive the associated strap to block movement of the associated bellows in the lateral direction and apply the compression counter force to the accordion bellows.

In another aspect, each spool includes a spindle for carrying the associated strap. Each spool further includes a detent mechanism for applying the compression counter force to the associated strap, which in turn applies the compression counter force to the accordion bellows.

In another aspect, the bladders include at least first and second bladders disposed on opposite sides of the longitudinal axis, and the drive mechanism further includes a manifold having an inlet fluidly connected to the compressor to receive pressurized fluid from the compressor. The manifold further includes first and second outlets fluidly connected to an associated one of the first and second bladders, with the manifold further having first and second solenoid valves attached to an associated one of the first and second outlets. Each of the first and second solenoid valves is movable between an open position to permit a flow of pressurized air to the associated first and second bladders and a closed position to block the flow.

In another aspect, the drive mechanism further includes two or more sensors coupled to the spools associated with the first and second bladders. These sensors generate first and second input signals associated with data indicating an angular rotation of the spools and/or a payout of the associated straps attached to the first and second bladders. The drive mechanism further includes a computer having one or more processors that electrically communicate with the sensors, the compressor, and the first and second solenoid valves. The computer further includes a non-transitory computer readable storage medium ("memory") storing instructions. The processor is programmed to determine first and second payout lengths of the straps dispensed by the spools for an associated one of first and second bladders, in response to the processor receiving the first and second input signals from an associated one of the sensors. The processor is further programmed to compare the first and second payout lengths to one another. The processor is further programmed to transmit a first open actuation signal to the first solenoid valve, in response to the processor determining that the second payout length is longer than the first payout length. The first solenoid valve moves to the open position, in response to the first solenoid valve receiving the first open actuation signal from the processor. The fluid flows from the first outlet to the first bladder, such that the first bladder moves a first side portion of the plow in the rearward direction, in response to the first solenoid valve moving to the open position. The processor is further programmed to transmit a second open actuation signal to the second solenoid valve, in response to the processor determining that the first payout length is longer than the second payout length. The second solenoid valve moves to the open position, in response to the second solenoid valve receiving the second open actuation signal from the processor. The fluid flows from the second outlet to the second bladder, such that the second bladder moves a second side portion of the plow in the rearward direction, in response to the second solenoid valve moving to the open position.

In another aspect, the processor is further programmed to transmit a first locking actuation signal to the first solenoid pawl associated with the first bladder, in response to the processor determining that the first payout length is longer than the second payout length. The first solenoid pawl moves to the first locked position to prevent rearward movement of the first side portion of the plow, in response to the first solenoid pawl receiving the first locking actuation signal. The processor is further programmed to transmit a second locking actuation signal to the second solenoid pawl associated with the second bladder, in response to the processor determining that the second payout length is longer than the first payout length. The second solenoid pawl moves to the second locked position to prevent rearward movement of the second side portion of the plow, in response to the second solenoid pawl receiving the second locking actuation signal.

In another aspect, the processor is further programmed to transmit the first open actuation signal to the first solenoid valve and the second open actuation signal to the second solenoid valve, in response to the processor determining that the first and second payout lengths are equal to one another. The fluid flows from the first and second outlets to an associated one of the first and second bladders, in response to the first and second solenoid valves moving to the open position, such that the first and second bladders concurrently move the first and second side portions of the plow in the rearward direction.

In another aspect, the detent mechanism includes a ratchet wheel, which is attached to the spindle and has a plurality of angled teeth. Each angled tooth includes a convex top, a side, and a concave root. The detent mechanism further includes two or more solenoid pawls. Each solenoid pawl is movable to a released position where the solenoid pawl is radially spaced from the angled teeth to permit the ratchet wheel to freely rotate. Each solenoid pawl is further movable to an unlocked position where the solenoid pawl slides along the side of the associated tooth to permit the ratchet wheel to rotate up to one step. Each solenoid pawl is further movable to a locked position where the solenoid pawl abuts the concave root of the associated tooth to prevent the ratchet wheel from rotating. The solenoid pawls are angularly spaced from one other about the ratchet wheel, such that one of the solenoid pawls is disposed in the unlocked position in response to the other solenoid pawl being disposed in the locked position. A step threshold of the predetermined stepped payout rate is associated with a minimum angular rotation of the associated spool from a first rotational position where one of the solenoid pawls is disposed in the locked position to a second rotational position where the other solenoid pawl is disposed in the locked position.

In another aspect, the processor is further programmed to compare the angular rotation of the spools to the step threshold, in response to the processor receiving the first and second input signals from the two sensors. The processor is further programmed to identify a complete step payout indicating that one of the solenoid pawls is disposed in the locked position, in response to the processor determining that the angular rotation is not less than the step threshold. The processor is further programmed to compare the angular rotation of the spools to a number of rotations associated with a maximum payout threshold, in response to the processor identifying the complete step payout. The maximum payout threshold is associated with a total length of the strap being deployed from the associated spool. The processor is further programmed to identify a complete maximum payout where the angular rotation is not less than the number of rotations associated with the maximum payout threshold. The processor is further programmed to transmit a compressor deactivation signal to the compressor, such that the compressor stops pressurizing the fluid, in response to the processor identifying the complete maximum payout. The processor is further programmed to identify an incomplete maximum payout where the angular rotation is less than the number of rotations associated with the maximum payout threshold. The processor is further programmed to transmit a release actuation signal to one of the first and second solenoid pawls to move the associated one of the first and second solenoid pawls from the locked position to the released position, such that the spool is free to rotate by another step, in response to the processor identifying the incomplete maximum payout.

In another aspect, the processor is further programmed to identify an incomplete step payout indicating that the solenoid pawls are spaced from the locked position, in response to the processor determining that the angular rotation is less than the step threshold. The processor is further programmed to transmit the compressor actuation signal to the compressor for continuing to further pressurize the fluid, in further response to the processor identifying the incomplete step payout. The processor is further programmed to compare the angular rotation of the spools to the step threshold after continuing to further pressurize the fluid. The processor is further programmed to identify a second incomplete step payout after continuing to further pressurize the fluid, in response to the processor determining that the angular rotation of the spools is less than the step threshold. The processor is further programmed to transmit the compressor deactivation signal to the compressor, in response to the processor identifying the second incomplete step. The processor is further programmed to compare the angular rotation of the spools to the number of rotations associated with the maximum payout threshold in response to the processor identifying the complete step payout.

In another aspect, the detent mechanism is a brake having an eccentric oblong body configured to engage the strap with a predetermined frictional force. The predetermined frictional force provides the compression counter force, which is exceeded by the drive force, in response to the pressure of the fluid in the associated bladder being at least the predetermined drive pressure threshold.

According to several aspects, a method is provided for operating a tension-loaded drive mechanism ("drive mechanism") for a cargo unloader. The method includes receiving, using multiple bladders fluidly connected to a compressor, a fluid from the compressor. The method further includes transmitting, using multiple spools and multiple straps attached to each bladder, a compression counter force via the straps to the associated bladders in a forward direction. The method further includes increasing, using the compression counter force, the pressure of the fluid in the associated bladders to a predetermined drive pressure threshold. The method further includes dispensing, using the spools, an associated one of the straps at a predetermined stepped payout rate. The method further includes expanding the associated bladders in a rearward direction along a longitudinal axis of a cargo bed and opposite to the forward direction to transmit a drive force that is associated with the predetermined drive pressure threshold. The method further includes transmitting, using a plow attached to the bladders, the drive force from the bladders to a cargo positioned in the cargo bed, such that the plow moves the cargo in the rearward direction, in response to the bladders expanding in the rearward direction.

In one aspect, the method further includes transmitting, using one or more of the straps attached to a pair of opposing lateral ends of a cap, the compression counter force to an associated accordion bellows. The method further includes transmitting, using one or more of the straps, a lateral force to a side of the associated accordion bellows in a lateral direction that is transverse to the longitudinal axis of the cargo bed.

In another aspect, the method further includes carrying, using a spindle of the spool, the associated strap. The method further includes transmitting, using a detent mechanism of the spool, the compression counter force to the associated strap, which in turn transmits the compression counter force to the accordion bellows.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
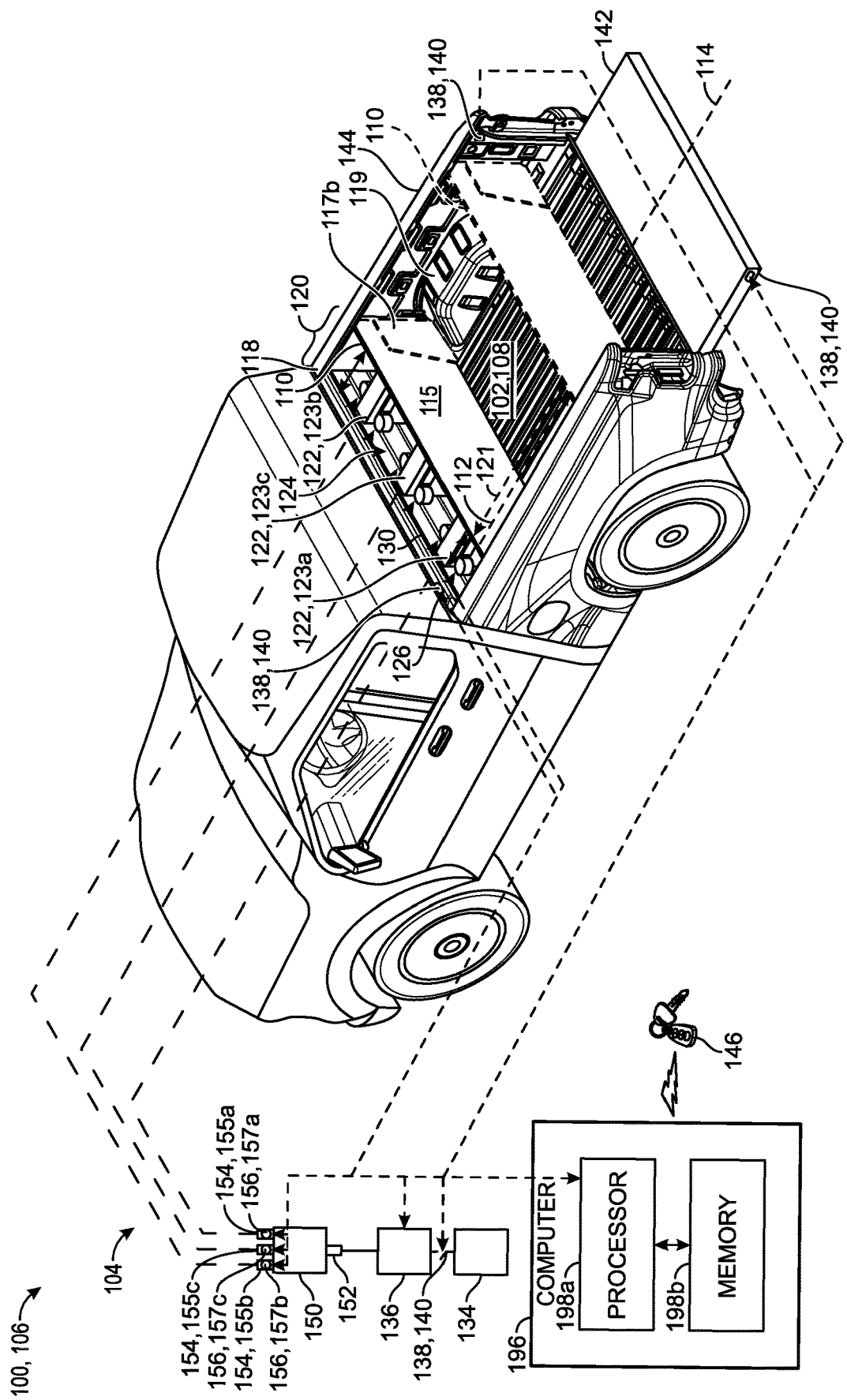
FIG. 1 is a perspective view of one non-limiting example of a truck having a truck bed with a cargo unloader attached to a front end of the truck bed for unloading cargo from the truck bed.

Referring to FIG. 1, there is generally illustrated one example of a vehicle 100 having a cargo bed 102 with a cargo unloader 104. In this non-limiting example, the vehicle 100 is a truck 106 having a truck bed 108. In other non-limiting examples, the vehicle may include a box van, a sports utility vehicle, a wagon, a bus, a train, other land vehicles, an aircraft, a watercraft, and the like, which have a cargo bed, storage space, luggage compartment, or other suitable space for storing cargo. Continuing with the present example, the cargo unloader 104 has a plow 110 configured to move in a rearward direction 112 along a longitudinal axis 114 of the truck bed 108 to unload or access cargo 116 (e.g., gravel, topsoil, sand, mulch, stones, bricks, other landscaping and/or construction material, delivery packages, large furniture, appliances, and the like) in the truck bed 108. The cargo unloader 104 is mounted exclusively to a forward end 118 of the truck bed 108, such that the plow 110 is a floating structure that is not attached directly to the truck bed 108. Similarly, the truck bed 108 does not include any fasteners (e.g., rails, grooves, etc.) for attaching to the plow 110, with such fasteners capable of being fouled with debris (e.g., gravel, topsoil, sand, mulch, etc.) that may obstruct rearward movement of the plow 110. As described in detail below, the cargo unloader 104 includes a tension-loaded drive mechanism 120 ("drive mechanism") with multiple bladders 122 and a strap system 124 configured to transmit a sufficient drive force to move the cargo 116 via the floating plow 110 along the longitudinal axis 114 of the truck bed 108. The drive mechanism 120 is further configured to maintain the floating plow 110 in a desired orientation relative to the longitudinal axis 114 (e.g. orthogonal to the axis when the plow has a planar rear surface for moving cargo). In other non-limiting examples, the plow may be attached directly to the truck bed by rails, grooves, or other suitable fasteners.

Figure 2:
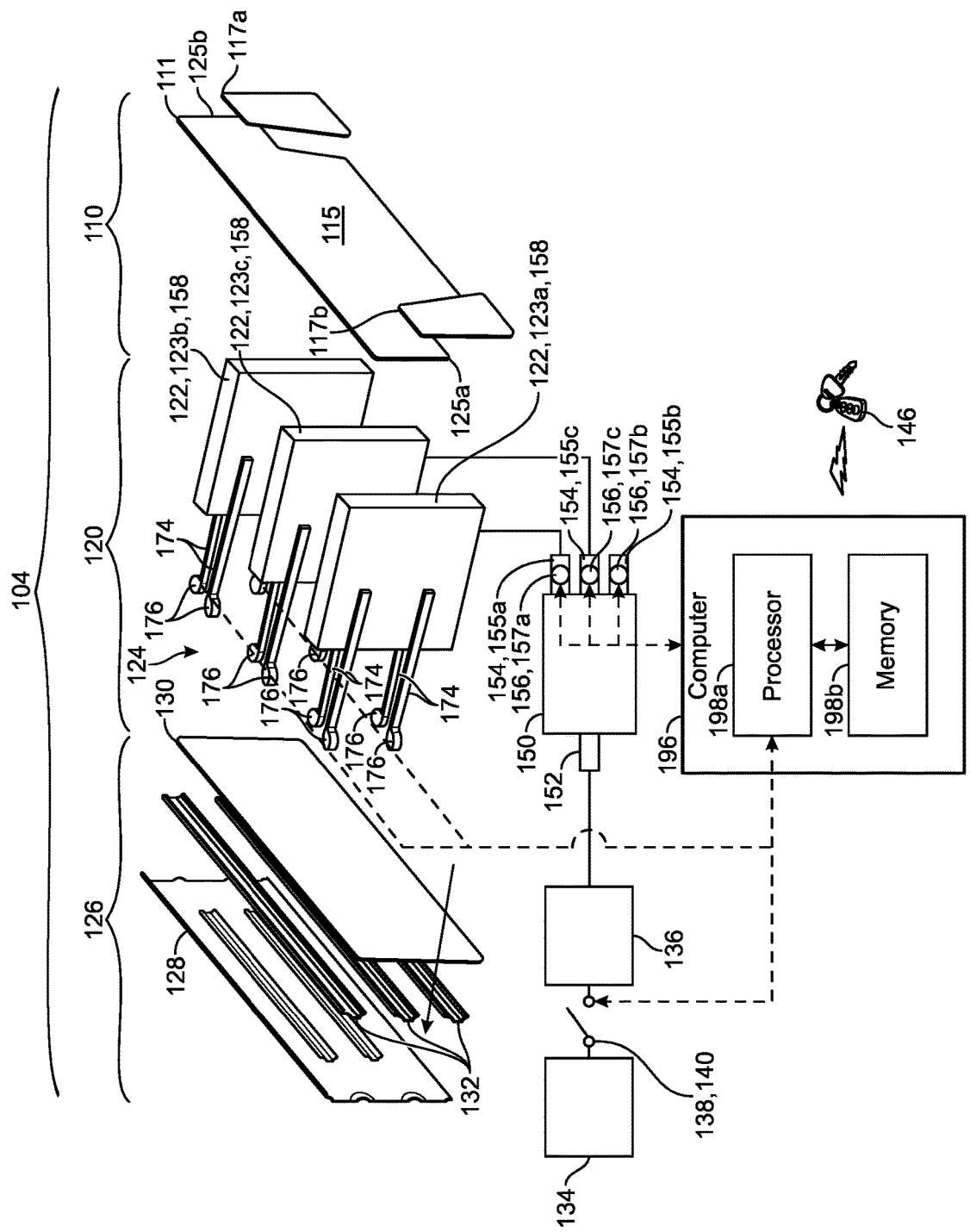
FIG. 2 is an exploded view of the non-limiting example of the cargo unloader of FIG. 1, illustrating the cargo unloader having three bladders attached to a forward panel and a strap system with four straps and four spools for each of the bladders.

As best shown in FIG. 2, the cargo unloader 104 may include a forward panel assembly 126 for mounting the drive mechanism 120 to a forward end 118 of the truck bed 108. The forward panel assembly 126 may include front and back panels 128, 130 attached to one another with one or more reinforcement members 132 (e.g., beams, etc.) supporting the front and/or back panels 128, 130. The forward panel assembly 126 may be the only portion of the cargo unloader 104 that is attached to the truck bed 108 or any other portion of the vehicle 100. As a result, the forward panel assembly 126 may include any suitable fastener for attaching the cargo unloader to the truck bed as an aftermarket accessory capable of being installed on the truck. However, it is contemplated the cargo unloader with the forward panel assembly may be an integral OEM accessory installed on the vehicle by the manufacturer. Furthermore, in other non-limiting examples, the cargo unloader may not have the forward panel assembly, and the drive mechanism as described in detail below may be attached directly to the truck bed or any other portion of the vehicle.

Referring to FIGS. 1 and 2, the drive mechanism 120 includes a power supply 134 (e.g., a vehicle battery, an alternator, etc.), a compressor 136 for increasing the pressure of a fluid. The drive mechanism 120 further includes an actuator 138 for electrically connecting the power supply 134 to the compressor 136 for supplying power to the compressor 136. In this non-limiting example, the actuator 138 can be a dead man switch 140 integrated in a lift gate 142 (FIG. 1), a sidewall 144 of the truck bed 108, a key fob 146, a smart phone application, a vehicle control device 148 within a passenger cabin, and the like. In other examples, the actuator may be a single-press button that does not require an occupant or other user to press and hold the button. The compressor 136 is air compressor for converting the power into potential energy stored in pressurized air, in response to actuator 138 being activated by the occupant. In other non-limiting examples, the cargo unloader may have a hydraulic pump configured to move hydraulic fluid (e.g., hydraulic oil etc.) for transmitting power to the plow.

The drive mechanism 120 further includes a manifold 150 having an inlet 152 fluidly connected to the compressor 136 to receive pressurized fluid from the compressor 136. The manifold 150 further includes multiple outlets 154 fluidly connected to an associated one of the bladders 122. The manifold 150 further includes multiple solenoid valves 156 attached to an associated one of the outlets 154 for moving between an open position to permit a flow of pressurized air from the outlet 154 to the associated bladder 122 and a closed position to block the flow. In this non-limiting example, where the drive mechanism 120 has three bladders 123a, 123b, 123c as described below, the manifold 150 has first, second, and third outlets 155a, 155b, 155c fluidly connected to an associated one of first, second, and third bladders 123a, 123b, 123c. The manifold 150 further includes first, second, and third solenoid valves 157a, 157b, 157c attached to an associated one of the first, second, and third outlets 155a, 155b, 155c. Each of the first, second, and third solenoid valves 157a, 157b, 157c are movable between an open position to permit the flow of pressurized air to the associated first and second bladders and a closed position to block the flow. In other examples, the drive mechanism may not include a manifold, and/or the compressor may be fluidly connected directly to one or more of the bladders. Furthermore, in other examples, the bladders may be fluidly connected to one another for providing multiple stages of inflation.

The bladders 122 are fluidly connected to the compressor 136 via the manifold 150 and configured to receive the pressurized fluid from the compressor 136. In this non-limiting example, the drive mechanism 120 may include first and second bladders 123a, 123b disposed on opposite sides of the longitudinal axis 114 and a third bladder 123c positioned colinear with the longitudinal axis 114. As described in detail below, the first and second bladders are configured to move associated first and second side portions of the plow 110 to correct or re-position the plow 110 when it is out-of-position or tilting by a non-perpendicular angle relative to the longitudinal axis of the truck bed. In other non-limiting examples, the drive mechanism can include more or fewer than three bladders disposed in any suitable position relative to the longitudinal axis. Each bladder 122 is configured to expand in a rearward direction 112 along the longitudinal axis 114 of the truck bed 108, in response to the associated bladder 122 receiving the fluid from the compressor 136, e.g., via the manifold 150. Each bladder 122 has an aspect ratio that permits the bladder 122 to expand by a predetermined length in the rearward direction 112 and inflate with sufficiently pressurized air, such that the bladders 122 collectively transmit a drive force for moving cargo with a predetermined mass rating.

Figure 3:
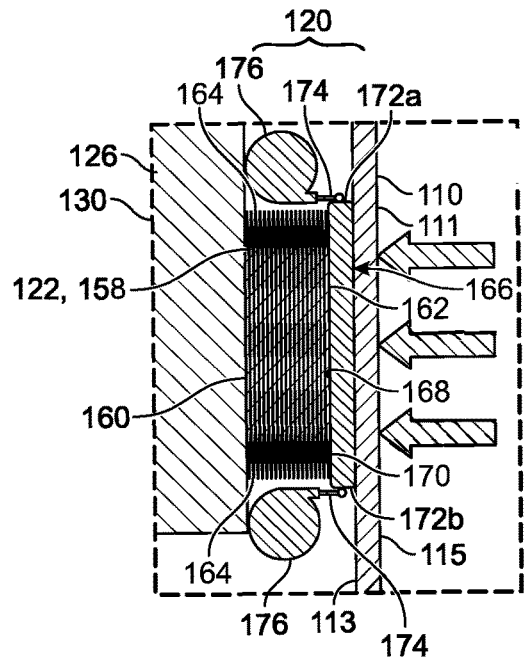
FIG. 3 is an enlarged top view of one of the bladders of FIG. 2, illustrating the bladder having an accordion bellows disposed in a collapsed position and an end plate attached to a rear end of the accordion bellows, with the straps attached to the end plate and retracted into the spools.
Figure 4:
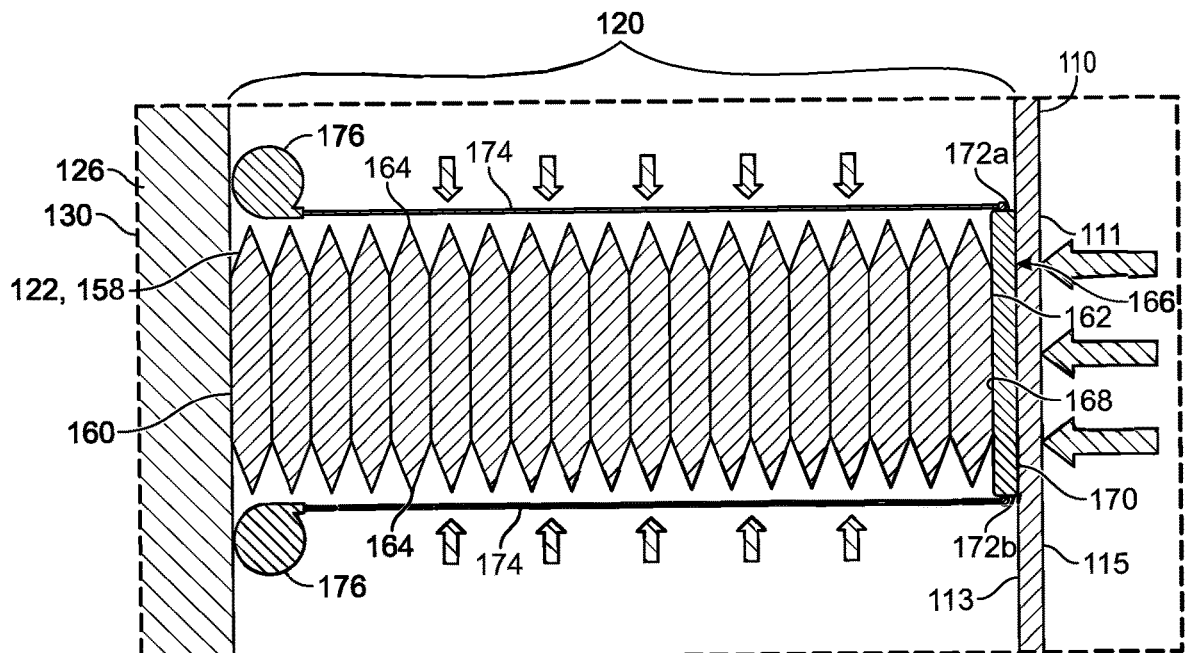
FIG. 4 is a top view of the bladder of FIG. 3, illustrating the bladder in an expanded position, with the spools dispensing a maximum payout of an associated one of the straps.
Figure 5A:
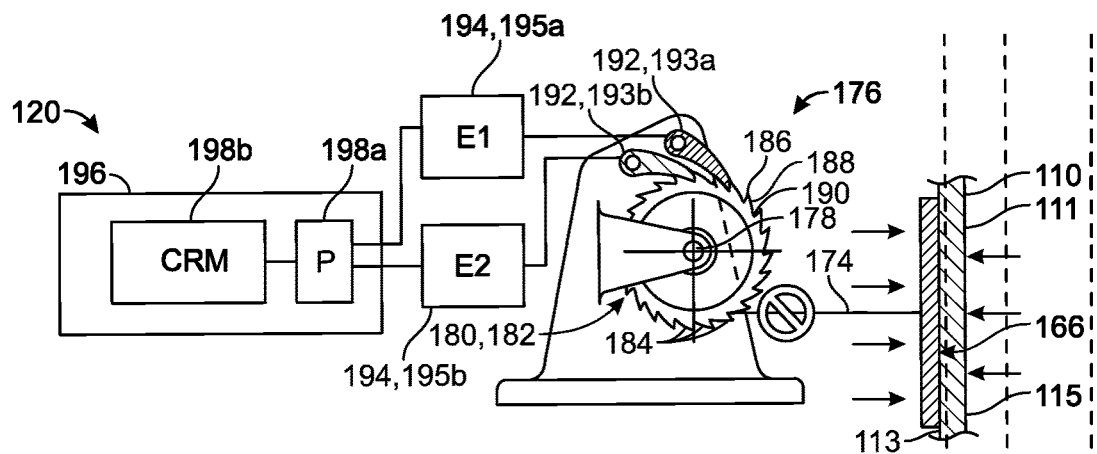
FIG. 5A is an enlarged side view of one of the spools of FIG. 2, illustrating the spool having a ratchet wheel and first and second solenoid pawls, with a first solenoid pawl disposed in a locked position to prevent rotation of the ratchet wheel and a second solenoid pawl disposed in an unlocked position.
Figure 5B:
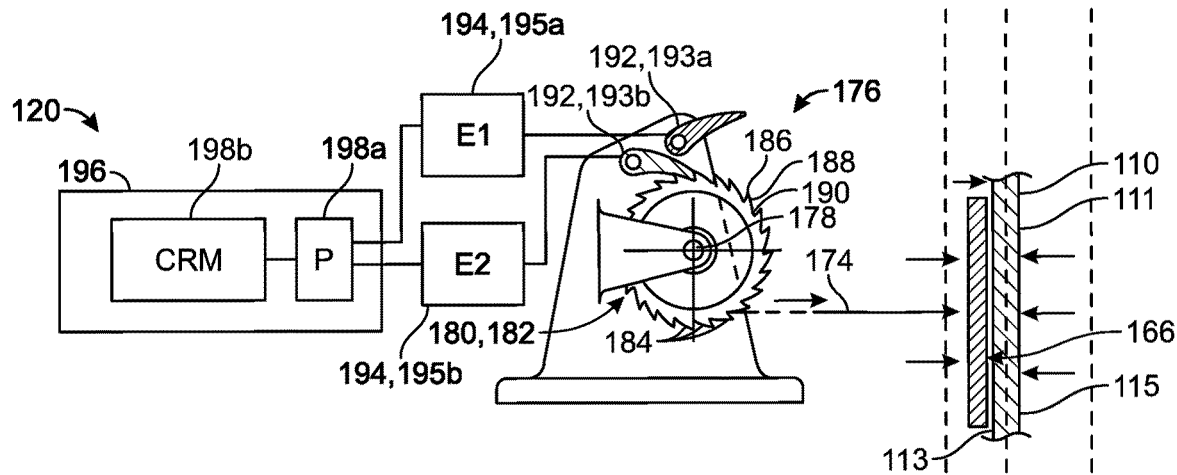
FIG. 5B is a side view of the spool of FIG. 5A, illustrating the first solenoid pawl moved to a released position to permit rotation of the ratchet wheel and payout of the associated strap by one step, as the associated bladder expands to move cargo and decrease in pressure.
Figure 5C:
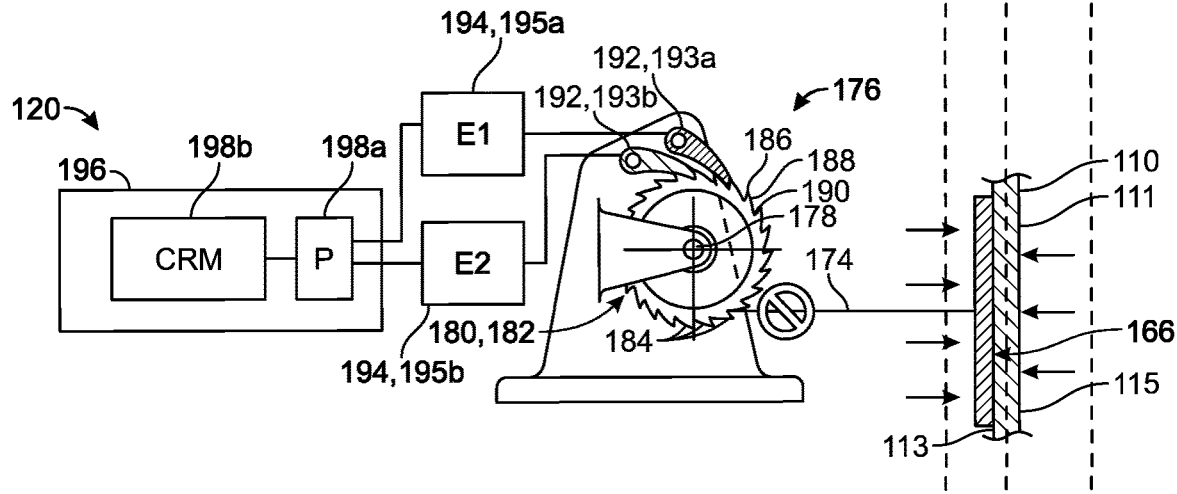
FIG. 5C is a side view of the spool of FIG. 5B, illustrating the second solenoid pawl moved to a locked position to prevent further rotation of the ratchet wheel and increase pressure in the associated bladder.
Figure 5D:
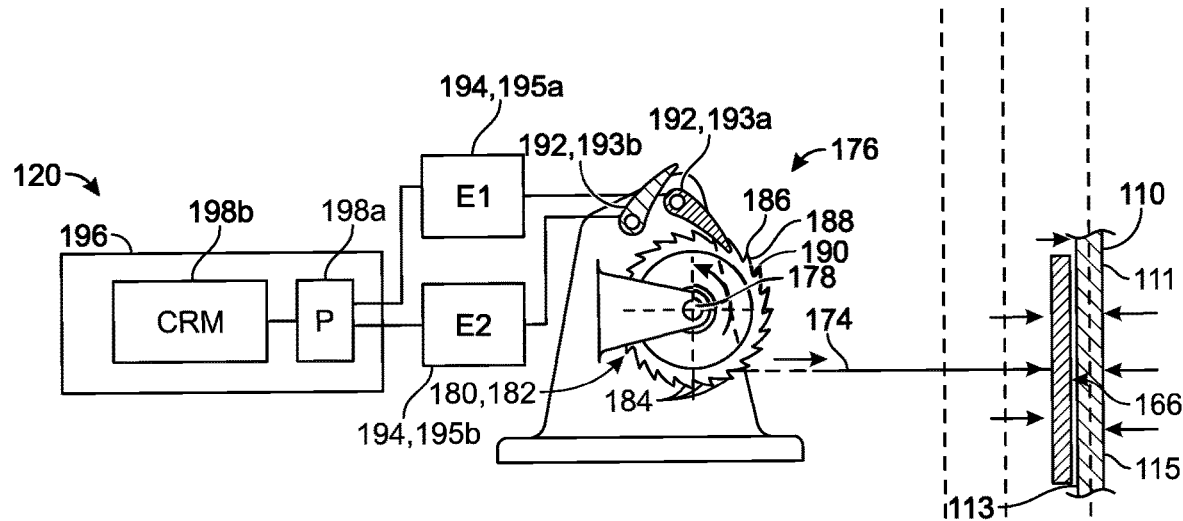
FIG. 5D is a side view of the spool of FIG. 5C, illustrating the first solenoid pawl moved to the unlocked position and the second solenoid pawl moved to the released position to permit rotation of the ratchet wheel and payout of the associated strap by another step, as the associated bladder expands to move cargo and decrease in pressure.
Figure 5E:
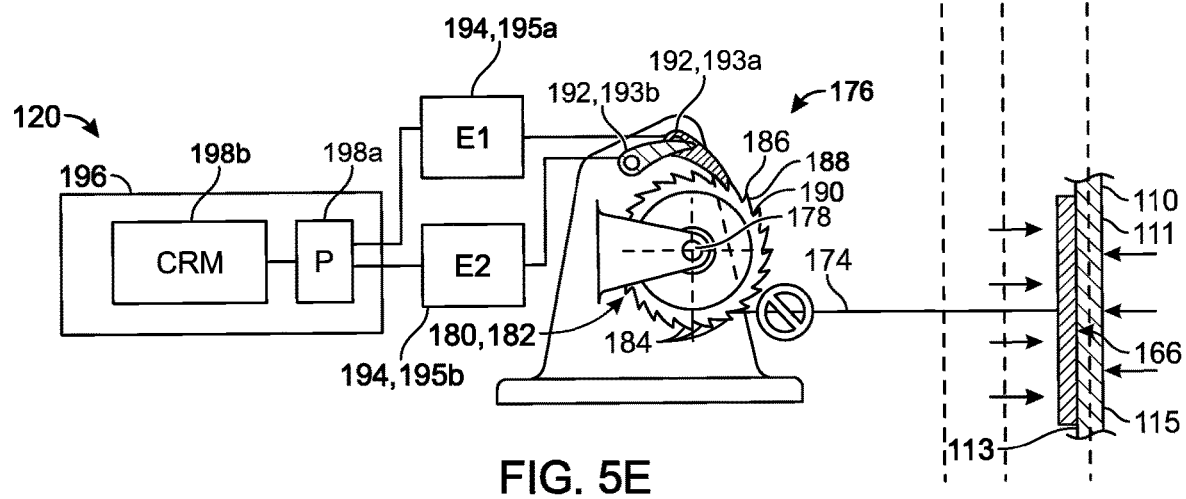
FIG. 5E is a side view of one non-limiting example of the spools of FIG. 5D, illustrating the first solenoid pawl moved to the locked position to prevent further rotation of the ratchet wheel and increase pressure in the associated bladder.

Referring to FIGS. 3 and 4, one non-limiting example of each bladder 122 is an accordion bellows 158 configured to expand in the rearward direction 112 along the longitudinal axis 114 and retract in the forward direction 121 along the longitudinal axis 114. The accordion bellows 158 includes a front end 160 attached to the forward panel assembly 126, a back end 162 opposite the front end 160, and a pair of sides 164a, 164b extending between the front and back ends 160, 162. The bladder 122 further includes a cap 166 having a forward surface 168 attached to the back end 162 of the accordion bellows 158, a rear surface 170 attached to the plow 110 (FIGS. 1 and 2) for moving the cargo in the rearward direction 112, and a pair of opposing lateral ends 172a, 172b.

The drive mechanism 120 further includes the strap system 124, which as described in detail below, has multiple straps and spools that cooperate with the plow to support and engage cargo, e.g., without requiring guidance by or attachment to the cargo bed. More specifically, the strap system 124 includes multiple straps 174 attached directly and/or indirectly to each of the bladders 122. Two or more of the straps 174 may be attached to an associated one of opposing lateral ends 172a, 172b of the cap 166, which is in turn attached to the rear end of the accordion bellows 158. The straps 174 transmit the compression counter force to the associated accordion bellows 158. In this example, the straps 174 may further transmit a lateral force to the sides 164a, 164b of the accordion bellows 158 in a lateral direction that is transverse to the longitudinal axis 114 of the truck bed 108. This lateral force or transverse loading may facilitate the accordion bellows with inflating primarily in the rearward direction without buckling in the lateral direction (e.g., by maintaining an aspect ratio of the accordion bellows within a predetermined range etc., such as maintaining a constant width) and eliminating a need for fasteners or other devices that couple the plow or directly to the walls or floor of the truck bed. However, other examples of the strap system may include fasteners or other devices that couple the plow directly to the walls or floor of the truck bed.

The strap system 124 may further include multiple spools 176 for an associated one of the straps 174. The spools 176 are configured to apply the compression counter force via the straps 174 to the associated bladders 122 in a forward direction 121 opposite to the rearward direction 112, such that the compression counter force increases the pressure of the fluid in the associated bladders 122 to a predetermined drive pressure threshold. The spools 176 are further configured to dispense an associated one of the straps at a predetermined stepped payout rate, such that the associated bladders expand in the rearward direction 112 and apply a drive force associated with the predetermined drive pressure threshold. The plow 110 transmits the drive force from the bladders 122 to the cargo 116 positioned in the truck bed 108, such that the plow 110 moves the cargo 116 in the rearward direction 112 in response to the bladders 122 expanding in the rearward direction 112. While the illustrated example of the strap system 124 includes four straps 174 dispensed from an associated one of the four spools 176 and positioned externally relative to an interior volume of the accordion bellows 158, other non-limiting examples of the strap system can have more or fewer than four associated spools and more or fewer than four straps attached to external and/or internal surfaces of the bladders, that are within or external to the interior volume of the accordion bellows.

Referring to FIGS. 5A-5E, each of the spools 176 includes a spindle 178 for carrying the associated strap 174. Each spool 176 further includes a detent mechanism 180 for applying the compression counter force to the associated strap 174 that in turn applies the compression counter force to the accordion bellows 158 (FIGS. 1-4). In this non-limiting example, the detent mechanism 180 includes a ratchet wheel 182 attached to the spindle 178 and having a plurality of angled teeth 184. Each of the angled teeth 184 includes a convex top 186, a side 188, and a concave root 190, and the detent mechanism 180 further includes first and second solenoid pawls 193a, 193b. As described in more detail below, each of the first and second solenoid pawls 193a, 193b is movable to a released position where the first and second solenoid pawls 193a, 193b are radially spaced from the angled teeth to permit the ratchet wheel to freely rotate. Each of the first and second solenoid pawls 193a, 193b is further movable to an unlocked position where the first and second solenoid pawls 193a, 193b slide along the side of the associated tooth to permit the ratchet wheel to rotate up to one step. Each of the first and second solenoid pawls 193a, 193b is further movable to a locked position where the first and second solenoid pawls 193a, 193b abut the concave root 190 of the associated tooth to prevent the ratchet wheel from rotating. The first and second solenoid pawls 193a, 193b are angularly spaced about the ratchet wheel 182 such that one of the first and second solenoid pawls 193a, 193b is disposed in the unlocked position, in response to the other of the first and second solenoid pawls 193a, 193b being disposed in the locked position. A step threshold of the predetermined stepped payout rate may be a minimum angular rotation of the associated spool 176 between one angular position where one of the first and second solenoid pawls 193a, 193b may abut the concave root 190 and be disposed in the locked position to another angular position where the other of the first and second solenoid pawls 193a, 193b may abut the concave root 190 and be disposed in the locked position.

The drive mechanism 120 further includes two or more sensors 194 coupled to the spools for the first and second bladders 123a, 123b, with the sensors 194 generating first and second input signals associated with data indicating an angular rotation of the spools 176 and a payout of the associated straps attached to the first and second bladders 123a, 123b. In this non-limiting example, the sensors 194 are first and second sets of rotary encoders 195a, 195b coupled to the spools associated with the first and second bladders 123a, 123b. Each of the first and second sets of rotary encoders 195a, 195b generate first and second input signals associated with data indicating an angular rotation of the spools and a payout of the associated straps attached to the associated first and second bladders 123a, 123b.

The cargo unloader 104 further includes the plow 110 attached to the bladders 122 and configured to transmit the drive force from the bladders 122 to the cargo positioned in the truck bed 108 of the vehicle 100, such that the plow 110 moves the cargo 116 in the rearward direction 112 in response to the bladders 122 expanding in the rearward direction 112. As mentioned above, in this example, the plow 110 is not attached directly to the truck bed 108, and the truck bed 108 does not have an associated fastener that is capable of being fouled by the cargo. As shown in the non-limiting example illustrated in FIG. 2, the plow 110 may include a primary panel 111 having a forward face 113 attached to the bladders 122 and a rearward face 115 capable of contacting the cargo 116 and moving the cargo 116 in the rearward direction 112 in response to the bladders 122 expanding in the rearward direction 112. The plow 110 may further include a pair of sub-panels 117a, 117b (FIG. 2) slidably attached to the primary panel 111 and configured to move between a lower position and an upper position to clear a pair of wheel wells 119 (FIG. 1) when the plow 110 moves in the rearward direction 112.

In this non-limiting example, the drive mechanism 120 further includes a computer 196 having one or more processors 198a electrically communicating with sensors 194, (e.g., first and second rotary encoders 195a, 195b of FIGS. 5A-5E, etc.), the compressor 136, and the first and second solenoid valves 157a, 157b. The computer 196 further includes a non-transitory computer readable storage medium 198b ("memory") storing instructions.

The processor may be programmed to correct an orientation of the plow or deactivate the plow, in response to the processor determining that the plow 110 has become tilted or out-of-position when the plow 110 is moving in the rearward direction. More specifically, the processor 198a is programmed to determine first and second payout lengths of the straps 174 dispensed by the spools for an associated one of first and second bladders 123a, 123b, in response to the processor 198a receiving the first and second input signals from an associated one of the two sensors 194. In this example, the processor 198a may be programmed to determine the first and second payout lengths of the straps for an associated one of first and second bladders 123a, 123b, in response to the processor 198a receiving the first and second input signals from the first and second sets of rotary encoders 195a, 195b.

The processor 198a is further programmed to compare the first and second payout lengths to one another. The processor 198a is further programmed to transmit a first open actuation signal to the first solenoid valve 157a, in response to the processor 198a determining that the second payout length is longer than the first payout length. The first solenoid valve 157a moves to the open position, in response to the first solenoid valve 157a receiving the first open actuation signal from the processor 198a. The fluid flows from the first outlet 155a to the first bladder 123a, such that the first bladder 123a moves the first side portion 125a of the plow 110 in the rearward direction 112, in response to the first solenoid valve 157a moving to the open position.

The processor 198a is further programmed to transmit a second open actuation signal to the second solenoid valve 157b, in response to the processor 198a determining that the first payout length is longer than the second payout length. The second solenoid valve 157b moves to the open position, in response to the second solenoid valve 157b receiving the second open actuation signal from the processor 198a. The fluid flows from the second outlet 155b to the second bladder 123b, such that the second bladder 123b moves the second side portion 125b of the plow 110 in the rearward direction 112, in response to the second solenoid valve 157b moving to the open position.

The processor 198a is further programmed to transmit a first locking actuation signal to the solenoid pawl associated with the first bladder 123a, in response to the processor 198a determining that the first payout length of the straps attached to the first bladder 123a is longer than the second payout length of the straps attached to the second bladder 123b. The solenoid pawl 193a moves to the locked position to prevent rearward rotation of the spool and associate movement of the first side portion 125a (FIG. 2) of the plow 110, in response to the solenoid pawl associated with the first bladder 123a receiving the locking actuation signal.

The processor 198a is further programmed to transmit a second locking actuation signal to the solenoid pawl associated with the second bladder 123b, in response to the processor 198a determining that the second payout length of the straps attached to the second bladder 123b is longer than the first payout length of the straps attached to the first bladder 123a. The solenoid pawl associated with the second bladder 123b moves to the locked position to prevent rearward movement of the second side portion 125b (FIG. 2) of the plow 110, in response to the solenoid pawl associated with the second bladder 123b receiving the locking actuation signal.

The processor 198a is further programmed to concurrently transmit the first open actuation signal to the first solenoid valve 157a (i.e., associated with the first bladder 123a) and the second open actuation signal to the second solenoid valve 157b (i.e., associated with the second bladder 123b), in response to the processor 198a determining that the first and second payout lengths are equal to one another. The fluid flows from the first and second outlets 155a, 155b to an associated one of the first and second bladders 123a, 123b, in response to the first and second solenoid valves 157a, 157b moving to the open position, such that the first and second bladders 123a, 123b concurrently move the first and second side portions 125a, 125b of the plow 110 in the rearward direction 112.

Referring generally to FIGS. 5A-5E, the processor 198a is further programmed to control a stepped deployment of the plow 110 based on movement of the spool, straps, and/or plow to leverage a compressor of a predetermined power rating to increase the pressure of the bladders to a predetermined pressure threshold for transmitting an associated drive force capable of moving the plow and cargo with a predetermined mass. The processor 198a is further programmed to deactivate the cargo unloader in response to the processor determining one or more conditions associated with a system fault. More specifically, the processor 198a is further programmed to compare the angular rotation of the spools 176 to the step threshold, in response to the processor 198a receiving the first and second input signals from the two sensors 194. In other examples, the processor may determine stepped deployment based on other suitable conditions or measurements associated with any component of the cargo unloader or the cargo itself.

Continuing with the present example, the processor 198a is further programmed to identify a complete step payout indicating that one of the first and second solenoid pawls 193a, 193b is disposed in the locked position, in response to the processor 198a determining that the angular rotation is not less than the step threshold. The processor 198a is further programmed to compare the angular rotation of the spools 176 to a number of rotations associated with a maximum payout threshold associated with a total length of the strap 174 being deployed from the associated spool 176, in response to the processor 198a identifying the complete step payout. The processor 198a is further programmed to identify a complete maximum payout, in response to the processor 198a determining that the angular rotation is not less than the number of rotations associated with the maximum payout threshold. The processor 198a is further programmed to transmit a compressor deactivation signal to the compressor 136 such that the compressor 136 stops pressurizing the fluid, in response to the processor 198a identifying the complete maximum payout. The processor 198a is further programmed to identify an incomplete maximum payout, in response to the processor 198a determining that the angular rotation is less than the number of rotations associated with the maximum payout threshold.

The processor 198a is further programmed to transmit a release actuation signal to one of the first and second solenoid pawls 193a, 193b to move the associated solenoid pawls the locked position to the released position, such that the spool 176 is free to rotate by another step, in response to the processor 198a identifying the incomplete maximum payout. The processor 198a is further programmed to transmit a compressor actuation signal to the compressor 136 for continuing to further pressurize the fluid in further response to the processor 198a identifying the incomplete maximum payout.

The processor 198a is further programmed to identify an incomplete step payout indicating that each of the first and second solenoid pawls 193a, 193b is spaced from the locked position, in response to the processor 198a determining that the angular rotation is less than the step threshold. The processor 198a is further programmed to transmit the compressor actuation signal to the compressor 136 for continuing to further pressurize the fluid, in further response to the processor 198a identifying the incomplete step payout.

The processor 198a is further programmed to compare the angular rotation of the spools 176 to the step threshold after continuing to further pressurize the fluid. The processor 198a is further programmed to identify a second incomplete step payout after continuing to further pressurize the fluid, in response to the processor 198a determining that the angular rotation of the spools 176 is less than the step threshold. The processor 198a is further programmed to transmit the compressor deactivation signal to the compressor 136, in response to the processor 198a identifying the second incomplete step. The processor 198a is further programmed to compare the angular rotation of the spools 176 to the number of rotations associated with the maximum payout threshold, in response to the processor identifying the complete step payout.

Figure 6:
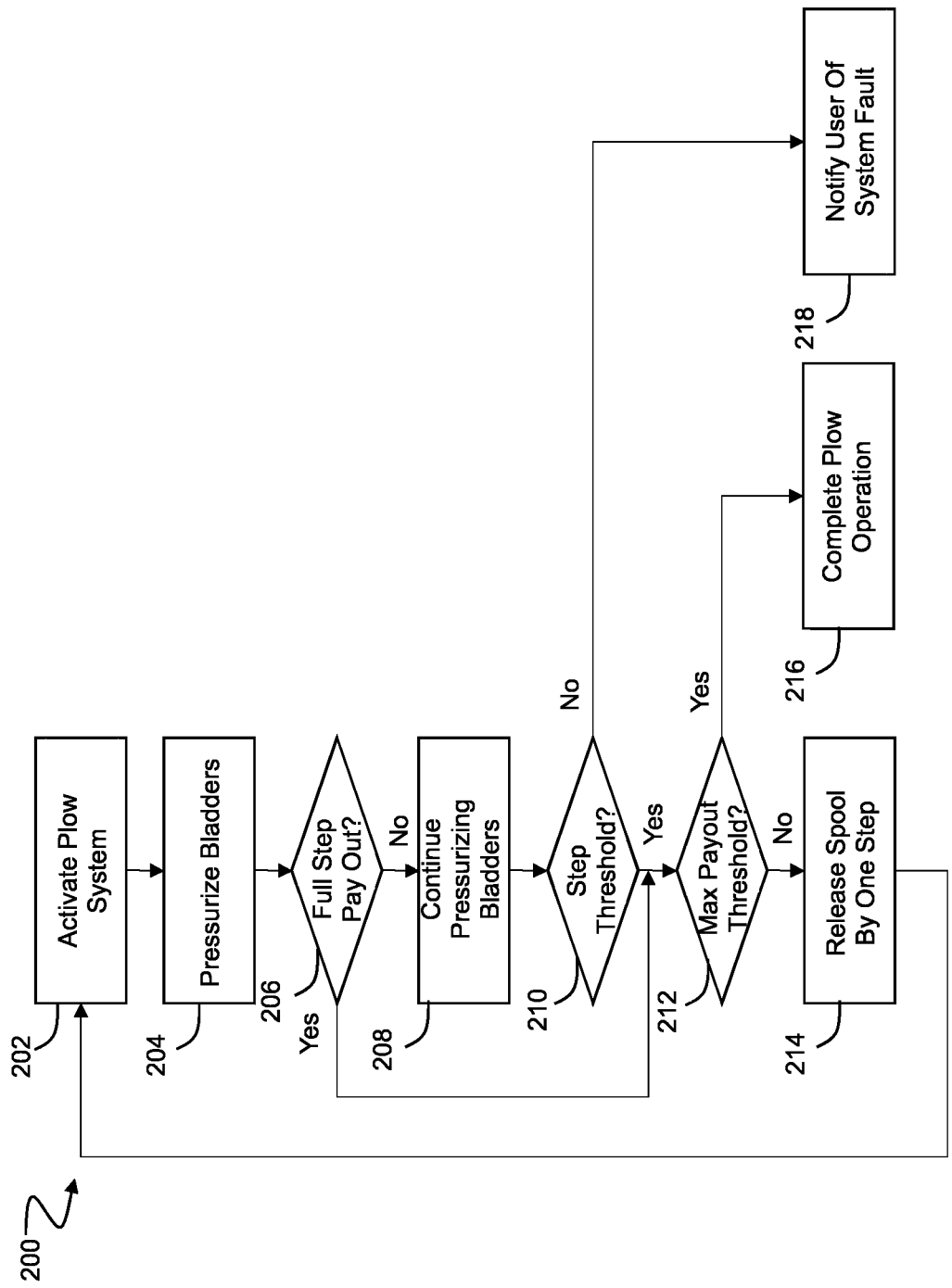
FIG. 6 is a flow chart of one non-limiting example of a method for operating the cargo unloader of FIG. 1.

Referring now to FIG. 6, a flow chart is provided for a non-limiting example of a method 200 for operating the cargo unloader 104 of FIG. 1 to provide stepped deployment of the plow 110 based on the movement of the ratchet wheel 182, the solenoid pawls, the straps, and/or the plow. The method 200 begins at block 202, with activating the plow 110. by, for example, the occupant operating the actuator 138 to electrically connect the power supply 134 (e.g., the vehicle battery or the alternator) to the compressor 136 for supplying power to the compressor 136. In this non-limiting example, the occupant presses and holds a dead man switch 140 integrated in the lift gate 142, the sidewall 144 of the truck bed 108, the key fob 146, the smart phone application, the vehicle control device within a passenger cabin, and the like. In other examples, the occupant can operate a single-press button, such as a toggle switch that does not need to be held, to electrically connect the power supply 134 to the compressor 136. The processor 198a transmits the compressor actuation signal to the compressor 136 and open actuation signals (e.g., first and second open actuation signals) to the associated solenoid valves (e.g., first and second solenoid valves). The method 200 then proceeds to block 204.

At block 204, the method 200 includes pressurizing, using the compressor 136, the fluid in response to the compressor 136 receiving power from the power supply 134 and the compressor 136 further receiving the compressor actuation signal from the processor 198a. Furthermore, the solenoid valves 156 (e.g., the first and second solenoid valves 157a, 157b) move to the open position, in response to the solenoid valves receiving the open actuation signals (e.g., first and second open actuation signals) from the processor 198a. The bladders 122 (e.g., the first and second bladders 123a, 123b) receive the pressurized fluid from the associated outlets 154 of the manifold 150, in response to the compressor 136 pressurizing the fluid and the solenoid valves moving to the open position. The method 200 further includes applying, using the spools 176 and the straps 174 attached to each bladder 122, a compression counter force via the straps to the associated bladders 122 in a forward direction 121. The method 200 further includes increasing, using the compression counter force, the pressure of the fluid in the associated bladders 122 to a predetermined drive pressure threshold. The method 200 further includes expanding the associated bladders in the rearward direction 112 along the longitudinal axis 114 of the truck bed 108 and opposite to the forward direction 121 to transmit the drive force that is associated with the predetermined drive pressure threshold. The method 200 further includes dispensing, using the spools 176, an associated one of the straps 174, a payout length associated with the expansion of the bladders 122, the drive force, and the cargo mass. The drive force of the bladders may decrease as the volume of the bladder expands. The method 200 further includes transmitting, using the plow 110 attached to the bladders 122, the drive force from the bladders 122 to the cargo 116 positioned in the truck bed 108, such that the plow 110 moves the cargo in the rearward direction 112 in response to the bladders 122 expanding in the rearward direction 112. The method 200 then proceeds to block 206.

At block 206, the method 200 includes comparing, using the processor 198a, the angular rotation of the spools to a number of rotations associated with the step threshold, in response to the processor receiving the first and second input signals from the two sensors (e.g., first and second rotary encoders 195a, 195b). If the processor 198a determines that the angular rotation is less than the step threshold, the processor 198a determines that a full step payout did not occur and identifies an associated incomplete step payout, and the method 200 proceeds to block 208. If the processor 198a determines that the angular rotation is not less than the step threshold, the processor 198a determines that a full step payout occurred and identifies an associated complete step payout, and the method 200 proceeds to block 212.

At block 208, the method 200 includes transmitting, using the processor 198a, the compressor actuation signal to the compressor 136 for continuing to further pressurize the fluid, in response to the processor 198a identifying the incomplete step payout. The method 200 further includes transmitting, using the processor 198a, the open actuation signals (e.g., first and second open actuation signals, etc.) to the solenoid valves 156 (e.g., the first and second solenoid valves 157a, 157b) for moving the solenoid valves to the open position and permitting the bladders to receive a flow of pressurized fluid from the associated outlets of the manifold, in response to the processor 198a identifying the incomplete step payout. The method 200 then proceeds to block 210.

At block 210, the method 200 includes comparing again, using the processor 198a, the angular rotation of the spools to a number of rotations associated with the step threshold, in response to the processor 198a receiving the first and second input signals from the two sensors (e.g., first and second rotary encoders 195a, 195b). If the processor 198a determines that the angular rotation is not less than the step threshold, the processor 198a determines that a full step payout occurred (e.g., one of the first and second solenoid pawls is disposed in the locked position) and identifies an associated complete step payout, and the method 200 proceeds to block 212. If the processor 198a determines that the angular rotation is less than the step threshold, the processor 198a determines that a full step payout did not occur and identifies an associated incomplete step payout, and the method 200 proceeds to block 218.

At block 212, the method 200 includes comparing, using the processor 198a, the angular rotation of the spools to a number of rotations associated with the maximum payout threshold, in response to the processor 198a identifying the complete step payout. The maximum payout threshold is associated with a total length of the strap being deployed from the associated spool. If the processor 198a determines that the angular rotation is less than the maximum payout threshold, the processor 198a identifies an incomplete maximum payout, and the method 200 proceeds to block 214. If the processor 198a determines that the angular rotation is not less than the maximum payout threshold, the processor 198a identifies a complete maximum payout, and the method 200 proceeds to block 216.

At block 214, the method 200 includes transmitting, using the processor 198a, the unlocked actuation signals to one or more solenoid pawls for the associated bladders and one or more released actuation signals to other solenoid pawls for the same bladders, such that the bladders may expand by one step. The method 200 further includes transmitting, using the processor 198a, a compressor actuation signal to the compressor 136 for continuing to further pressurize the fluid in further response to the processor 198a identifying the incomplete maximum payout. The method 200 then returns to block 202.

At block 216, the method 200 includes determining, using the processor 198a, that the plow operation has completed, in response to the processor 198a determining the complete maximum payout. The method 200 further includes transmitting, using the processor 198a, a compressor deactivation signal to the compressor 136. The compressor 136 stops pressurizing the fluid, in further response to the processor 198a identifying the complete maximum payout.

At block 218, the method 200 includes notifying, using a notification device 199, the occupant that the cargo unloader has encountered a system fault (e.g., an obstruction moving the plow out-of-position and rendering it unfunctional, the cargo mass exceeding a maximum driving force of the tension-loaded drive mechanism, a one or more ruptured bladders, a loss of pressure, etc.). Non-limiting examples of the notification device can include a speaker emitting a vocal instruction and/or chime, a display in the passenger cabin, one or more external vehicle lights, a smartphone app, etc.).

Figure 7:
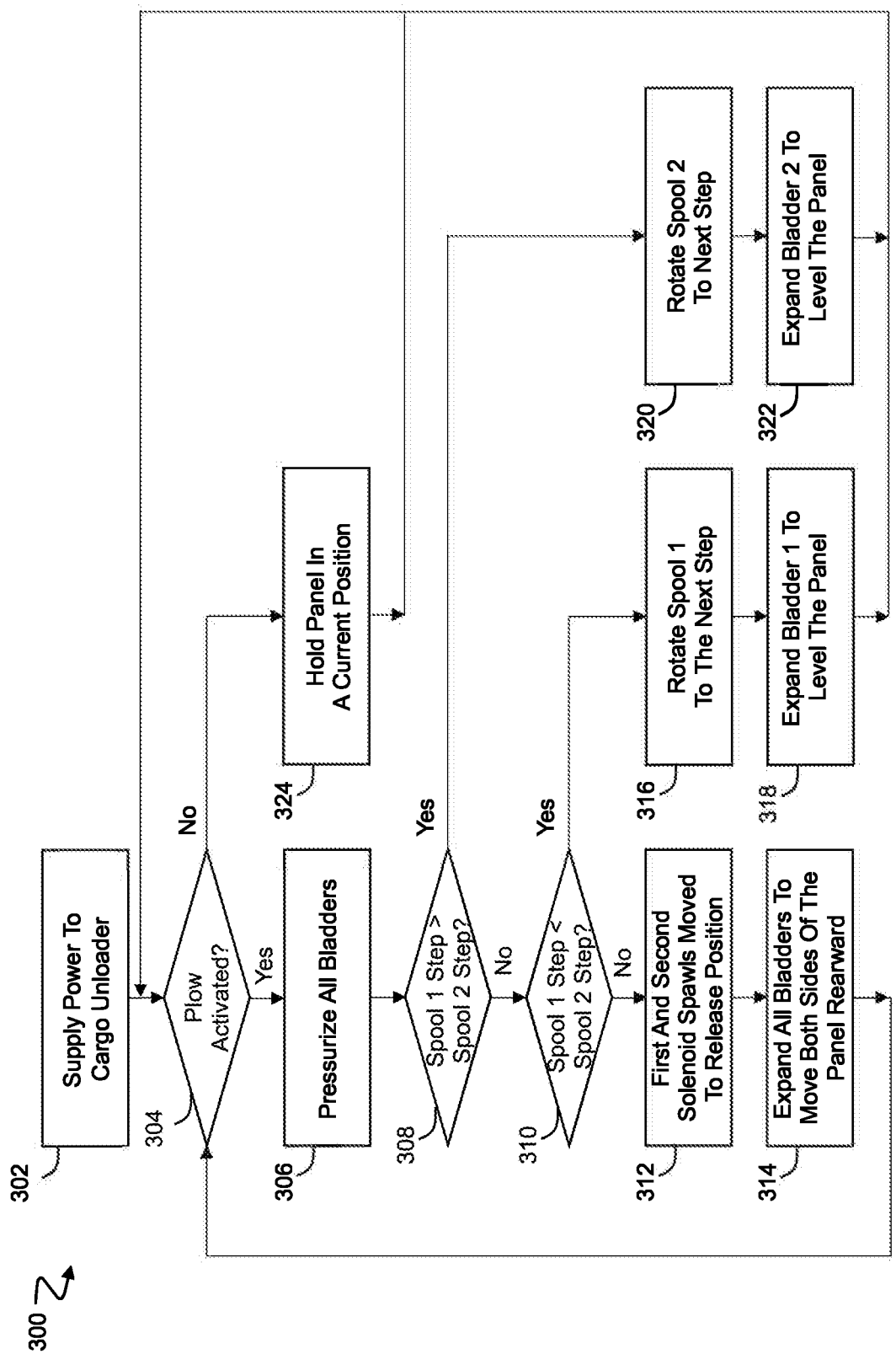
FIG. 7 is a flow chart of another non-limiting example of a method for operating the cargo unloader of FIG. 1, illustrating the method correcting a tilted plow.

Referring to FIG. 7, a flow chart is provided for another non-limiting example of a method 300 for operating the cargo unloader 104 of FIG. 1 with the tension-loaded drive mechanism 120. The method 300 begins at block 302, with the occupant supplying power to the cargo unloader 104, namely the computer 196, the sensors 194, the solenoid valves 156, and/or the solenoid pawls 192. This block may be accomplished by the occupant inserting a key into the vehicle ignition and turning the key to the "On" position, where the computer 196, the sensors 194, the solenoid valves, and/or the solenoid pawls 192 are electrically connected to the vehicle battery or alternator. The method 300 then proceeds to block 304.

At block 304, the method 300 further includes determining, using the processor 198a, whether the plow 110 has been activated by, for example, the occupant operating the actuator 138 to electrically connect the power supply 134 (e.g., the vehicle battery or the alternator) to the compressor 136 for supplying power to the compressor 136. In this non-limiting example, the occupant presses and holds a dead man switch 140 integrated in the lift gate 142, the sidewall 144 of the truck bed 108, the key fob 146, the smart phone application, the vehicle control device within a passenger cabin, and the like. In other examples, the occupant can operate a single-press button, such as a toggle switch that does not need to be held, to electrically connect the power supply 134 to the compressor 136. The processor 198a transmits the compressor actuation signal to the compressor 136 and open actuation signals (e.g., first and second open actuation signals) to the associated solenoid valves (e.g., first and second solenoid valves). The method 300 then proceeds to block 306.

At block 306, the method 300 further includes pressurizing, using the compressor 136, the fluid in response to the compressor 136 receiving power from the power supply 134 and the compressor 136 further receiving the compressor actuation signal from the processor 198a. Furthermore, the solenoid valves (e.g., the first and second solenoid valves 157a, 157b) move to the open position, in response to the solenoid valves receiving the open actuation signals (e.g., first and second open actuation signals) from the processor 198a. The bladders 122 (e.g., the first and second bladders 123a, 123b) receive the pressurized fluid from the compressor 136, in response to the compressor 136 pressurizing the fluid and the solenoid valves moving to the open position. The solenoid pawls 192 (e.g., the first and second solenoid pawls 195a, 195b) of the spools 176 are moved to the release position, in response to the processor 198a transmitting release actuation signals to the solenoid pawls. The spools are permitted to dispense or payout lengths of the associated straps 174 to permit the associated bladders to expand. The method 300 then proceeds to block 308.

At block 308, the method 300 further includes comparing, using the processor 198a, the first payout length, which is dispensed from the spool associated with the first strap and the first bladder 123a, to the second payout length, which is dispensed from the spool associated with the second strap and the second bladder 123b. If the processor 198a determines that the first payout length is not longer than the second payout length, then the method 300 proceeds to block 310. If the processor 198a determines that the first payout length is longer than the second payout length, then the method 300 proceeds to block 320.

At block 310, the method 300 further includes comparing again, using the processor 198a, the first payout length to the second payout length. If the processor 198a determines that the first payout length is not shorter than the second payout length, then the processor 198a determines that the first and second payout lengths are equal to one another, and the method 300 proceeds to block 312. If the processor 198a determines that the first payout length is shorter than the second payout length, then the method 300 proceeds to block B16.

At block 312, the method 300 further includes transmitting, using the processor 198a, the release actuation signal to the first and second solenoid pawls 193a, 193b, such that the first and second solenoid pawls 193a, 193b move to the release position, in response to the first and second solenoid pawls 193a, 193b receiving the release actuation signal. The method 300 then proceeds to block 314.

At block 314, the method 300 further includes transmitting again, using the processor 198a, the compressor actuation signal to the compressor 136 and open actuation signals to the associated solenoid valves (e.g., first and second open actuation signals to first and second solenoid valves). The bladders 122 (e.g., the first and second bladders 123a, 123b) receive the pressurized fluid from the compressor 136, in response to the compressor 136 pressurizing the fluid and the solenoid valves moving to the open position. The bladders 122 move the plow 110 along the longitudinal axis 114, with the tension-loaded drive mechanism 120 further holding the plow 110 in an orthogonal orientation relative to the longitudinal axis 114.

The bladders may move the plow in the rearward direction 112 by a distance based on a singular step payout for the straps and the spools associated with the first and second bladders 123a, 123b. In other examples, the bladders may move the plow by any distance not limited to a step payout, in response to the first and second solenoid pawls moving to and remaining the release position. The method 300 then returns to block 304.

At block 316, the method 300 further includes determining, using the processor 198a, that the plow 110 is out-of-position because the second side portion 125b of the plow 110 is moved along the truck bed 108 by a distance that is longer than a distance that the first side portion 125a of the plow 110 is moved (e.g., when a cargo load has a mass blocking movement of the first side portion 125a of the plow 110). The method 300 further includes transmitting, using the processor 198a, the first open actuation signal to the first solenoid valve 157a, and the first solenoid valve 157a moves to the open position in response to the first solenoid valve 157a receiving the open actuation signal. The method 300 further includes transmitting, using the processor 198a, the release actuation signal to the solenoid pawls associated with the first bladder 123a. The method 300 further includes transmitting, using the processor 198a, a locking actuation signal to one or more solenoid pawls 192 associated with the first bladder. The method 300 then proceeds to block 318.

At block 318, the method 300 further includes expanding the first bladder 123a such that the strap and first side portion 125a of the plow 110 is moved by the predetermined step payout in the rearward direction 112, in response to pressurized air flowing from the first outlet 155a of the manifold to the first bladder 123a. The method 300 further includes transmitting, using the processor 198a, the locking actuation signal to the pawl solenoid 192 that is associated with the second bladder 123b. The pawl solenoid 192 moves to the locked position, in response to receiving the locking actuation signal. The method 300 further includes holding, using one or more solenoid pawls that are associated with the second bladder 123b, the second bladder in a fixed position in response to the associated solenoid pawl being moved to the locked position. The method 300 then returns to block 304.

At block 320, the method 300 further includes determining, using the processor 198a, that the plow 110 is out-of-position because the first side portion 125a of the plow 110 is moved along the truck bed 108 by a distance that is longer than a distance that the second side portion 125b of the plow 110 is moved (e.g., when a cargo load has a mass blocking movement of the second side portion 125b of the plow 110). The method 300 further includes transmitting, using the processor 198a, the second open actuation signal to the second solenoid valve 157b, and the second solenoid valve 157b moves to the open position in response to the second solenoid valve 157b receiving the open actuation signal. The method 300 further includes transmitting, using the processor 198a, the release actuation signal to the solenoid pawls associated with the second bladder 123b. The method 300 further includes transmitting, using the processor 198a, the locking actuation signal to one or more solenoid pawls 192 associated with the second bladder. The method 300 then proceeds to block 322.

At block 322, the method 300 further includes expanding the second bladder 123b such that the strap and second side portion 125b of the plow 110 is moved by the predetermined step payout in the rearward direction 112, in response to pressurized air flowing from the second outlet 155b of the manifold to the second bladder 123b. The method 300 further includes transmitting, using the processor 198a, the locking actuation signal to the pawl solenoid 192 that is associated with the first bladder 123a. The pawl solenoid 192 moves to the locked position, in response to receiving the locking actuation signal. The method 300 further includes holding, using one or more solenoid pawls that are associated with the first bladder 123a, the first bladder in a fixed position in response to the associated solenoid pawls being moved to the locked position. The method 300 then returns to block 304.

At block 324, the method 300 further includes transmitting, using the processor 198a, closed actuation signals to each of the solenoid valves (e.g., first and second closed actuation signals to the first and second solenoid valves). The method 300 further includes moving the solenoid valves to the closed position, in response to the solenoid valves receiving the closed actuation signals. The method 300 further includes transmitting, using the processor 198a, the locking actuation signals to the pawl solenoids 192 associated with the first and second bladders 123a, 123b. The pawl solenoids 192 move to the locked position, in response to receiving the locking actuation signals. The method 300 further includes holding, using the solenoid pawls that are associated with all the bladders (e.g., the first and second bladders), the bladders in a fixed position in response to the associated solenoid pawls being moved to the locked position. The method 300 then returns to block 304.

Figure 8:
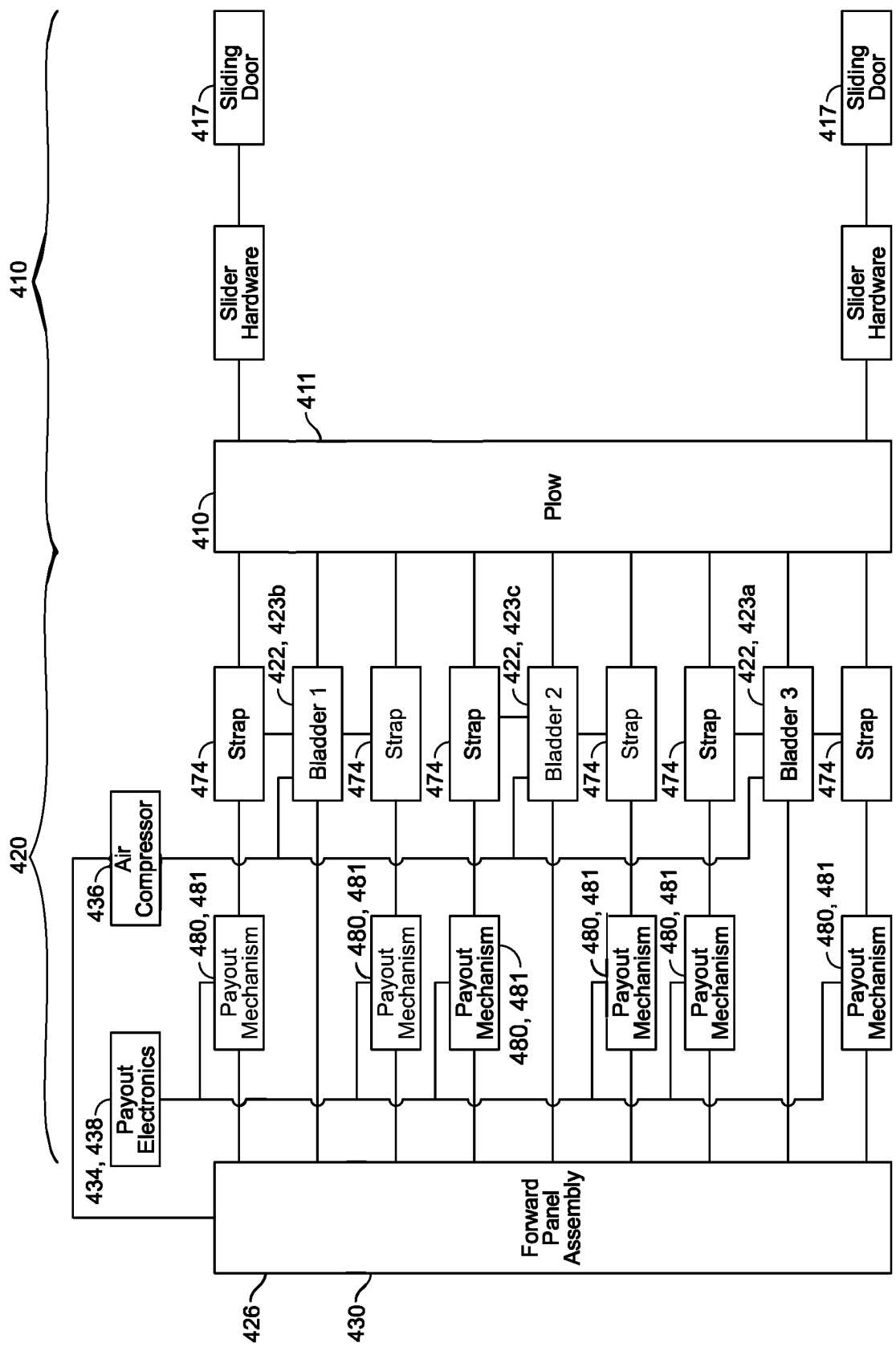
FIG. 8 is a schematic diagram of another example of the cargo unloader of FIG. 1, with the cargo unloader having spools with associated cam-body brakes.

Referring now to a schematic diagram of another non-limiting example shown in FIG. 8, an unloader 404 is similar to the cargo unloader 104 of FIG. 1 and includes the same components identified by the same numbers increased by 300. However, while the cargo unloader 104 includes a computer 196 using input signals from multiple sensors to control the solenoid pawls 192 of the detent mechanism 180 to engage associated ratchet wheels 182 (FIGS. 5A-5E), the cargo unloader 404 does not include a computer, sensors, or solenoid pawls. In this non-limiting example, the detent mechanism 480 is a purely mechanical brake 481 (e.g., a cam body with an eccentric oblong lobe having a friction surface for gripping the strap) configured to engage the strap 474 (FIG. 9) with a predetermined frictional force. The predetermined frictional force is the compression counter force that may be exceeded by the drive force, in response to the pressure of the fluid in the associated bladder increasing to a pressure that is not less than the predetermined drive pressure threshold.

Figure 9:
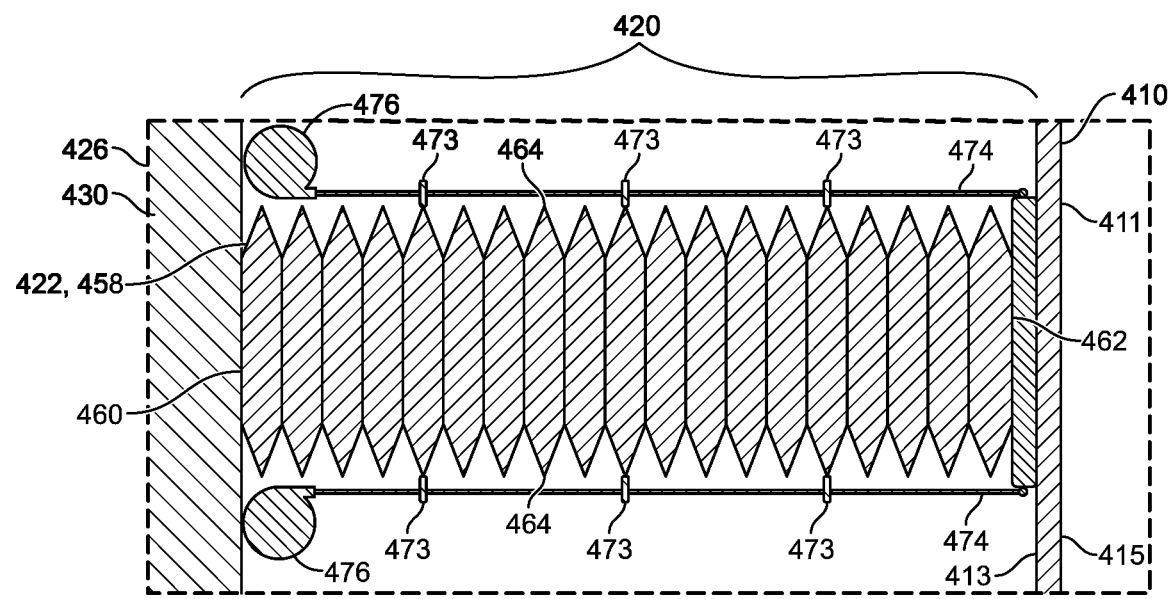
FIG. 9 is an enlarged top view of another non-limiting example of one of the bladders of FIG. 8, illustrating the bladder having multiple guide rings for receiving slidably attaching to the straps to prevent a lateral movement of the associated bladder.
Figure 10:
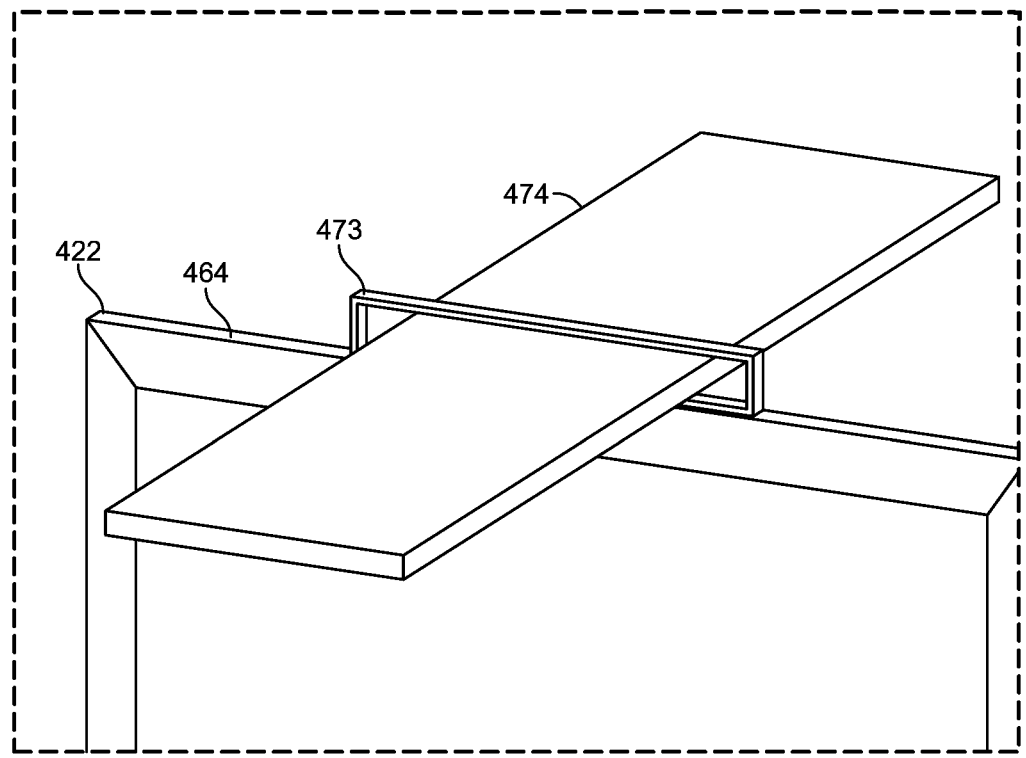
FIG. 10 is an enlarged view of one of the guide rings and straps of FIG. 10.

Referring to FIGS. 9 and 10, a bladder 422 for the cargo unloader 404 of FIG. 8 is similar to the bladder 122 shown in FIG. 3 and includes the same components identified by the same numbers increased by 3. However, the bladder 422 further includes a plurality of guide rings 463 that are attached to the opposing lateral sides 464 of the accordion bellows 458 and spaced from one another. Each guide ring 463 is configured to receive the associated strap 474 to hold the straps in associated positions for supporting the lateral sides 464 of the accordion bellows and blocking movement of the associated bellows 458 in the lateral direction. The guide rings 463 facilitate the straps 474 with applying the compression counter force to the accordion bellows 458 and improving the stability of the bladders 422.

Figure 11:
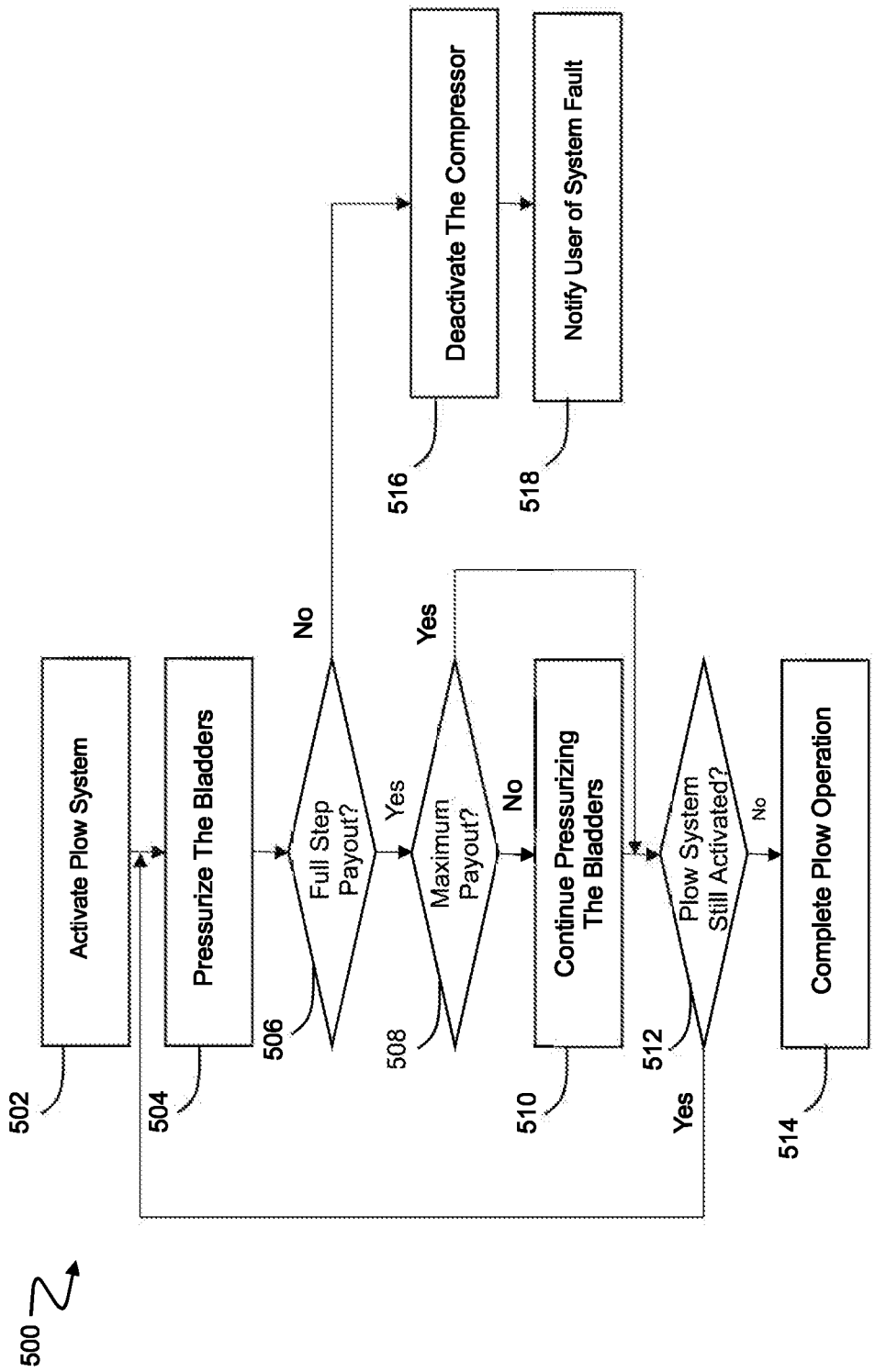
FIG. 11 is a flow chart of one non-limiting example of a method for operating the cargo unloader of FIG. 9.

Referring to FIG. 11, a flow chart of a non-limiting example of a method 500 is provided for operating the cargo unloader 404 of FIG. 8. The method 500 does not use sensors, solenoid valves, solenoid pawls, or a computer. The method 500 begins at block 502, with activating the plow 410. by, for example, the occupant operating the actuator 438 to electrically connect the power supply 434 (e.g., the vehicle battery or the alternator) to the compressor 436 for supplying power to the compressor 436. In this non-limiting example, the occupant presses and holds a dead man switch 440 integrated in the lift gate 442, the sidewall 444 of the truck bed 408, the key fob 446, the smart phone application, the vehicle control device within a passenger cabin, and the like. In other examples, the occupant can operate a single-press button, such as a toggle switch that does not need to be held, to electrically connect the power supply 434 to the compressor 436. The processor 198 transmits the compressor actuation signal to the compressor 136 and open actuation signals (e.g., first and second open actuation signals) to the associated solenoid valves (e.g., first and second solenoid valves). The method 500 then proceeds to block 504.

At block 504, the method 500 includes pressurizing, using the compressor 436, the fluid in response to the compressor 436 receiving power from the power supply 434 and the compressor 136 further receiving the compressor actuation signal from the processor 198. Furthermore, the solenoid valves (e.g., the first and second solenoid valves 157a, 157b) move to the open position, in response to the solenoid valves receiving the open actuation signals (e.g., first and second open actuation signals) from the processor 198a. The bladders (e.g., the first and second bladders 123a, 123b) receive the pressurized fluid from the associated outlets of the manifold, in response to the compressor 436 pressurizing the fluid and the solenoid valves moving to the open position. The method 500 further includes transmitting, using the spools and the straps attached to each bladder, a compression counter force via the straps to the associated bladders in a forward direction 121. The method 500 further includes increasing, using the compression counter force, the pressure of the fluid in the associated bladders to a predetermined drive pressure threshold. The method 500 further includes expanding the associated bladders in the rearward direction along the longitudinal axis 114 of the truck bed 108 and opposite to the forward direction 121 to transmit the drive force that is associated with the predetermined drive pressure threshold. The method 500 further includes dispensing, using the spools, an associated one of the straps a payout length associated with the expansion of the bladders, the drive force, and the cargo mass. The drive force of the bladders may decrease as the volume of the bladder expands. The method 500 further includes transmitting, using the plow 410 attached to the bladders 422, the drive force from the bladders 422 to the cargo positioned in the cargo bed, such that the plow 410 moves the cargo in the rearward direction in response to the bladders 422 expanding in the rearward direction. The method 500 then proceeds to block 506.

At block 506, the method 500 includes determining whether the pressure in the bladders 123a, 123b have increased up to a predetermined drive pressure threshold, such that a drive force associated with pressure in the bladders 122 is now higher than the frictional force (i.e., compression counter force) applied by the mechanical brake 481 (e.g., a cam body with an eccentric oblong lobe having a friction surface for gripping the strap) the associated strap 174. If the drive force is higher than the frictional force, the strap slips through the brake by a predetermined step payout length, and the bladder expands by a stepped payout. The rearward expansion of the bladder 422 and the associated increase in the volume of the bladder 422 may decrease the pressure in the bladder. The decreased pressure may in turn decrease the drive force associated with the pressure, such that the frictional force of the brake is once again higher than the drive force to prevent further rearward expansion of the associated bladder.

At block 508, the method 500 includes the occupant determining whether the payout of the strap has reached the maximum payout for that strap. In this example, the occupant may observe a marker on the straps indicating the complete maximum payout. If the occupant identifies the incomplete maximum payout, the method 500 proceeds to block 510. If the occupant identifies the complete maximum payout, the processor 198 identifies the complete maximum payout, and the method 500 proceeds to block 512. However, in other examples, the processor may identify the complete payout based on any number of conditions.

At block 510, the method 500 includes the compressor 436 continuing to further pressurize the fluid, in response to the occupant identifying the incomplete maximum payout. The method 500 then proceeds to block 512.

At block 512, the method 500 includes determining whether the actuator 438 (e.g., dead man switch 440) is still being held by the occupant. If the occupant is still holding the actuator 438, the method 500 returns to block 504. If the occupant is not holding the actuator 438, the method 500 proceeds to block 514 where the method 500 is terminated.

At block 516, the method 500 includes deactivating the compressor 436 by, for example, the occupant releasing the actuator 438.

At block 518, the method 500 includes notifying, using a notification device 499, the occupant that the cargo unloader 404 is experiencing a system fault.

In general, the computing systems and/or devices described may employ any of a number of computer operating systems, including, but by no means limited to, versions and/or varieties of the ANDROID AUTOMOTIVE OS developed by GOOGLE INC., the MICROSOFT WINDOWS operating system, the UNIX operating system (e.g., the SOLARIS operating system distributed by ORACLE Corporation of Redwood Shores, California), the AIX UNIX operating system distributed by INTERNATIONAL BUSINESS MACHINES of Armonk, New York, the LINUX operating system, the MAC OSX and iOS operating systems distributed by APPLE INC. of Cupertino, California, the BLACKBERRY OS distributed by BLACKBERRY LTD. of Waterloo, Canada, and the OPEN HANDSET ALLIANCE, or the QNX CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies. Some of these applications may be compiled and executed on a virtual machine. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The memory that participates in providing data (e.g., instructions) may be read by the computer (e.g., by a processor of a computer and may take many forms, including, but not limited to, non-volatile media and volatile media. Non-volatile media may include, for example, optical or magnetic disks and other persistent memory. Volatile media may include, for example, dynamic random-access memory, which typically constitutes a main memory. Such instructions may be transmitted by one or more transmission media, including coaxial cables, copper wire and fiber optics, including the wires that comprise a system bus coupled to a processor of an engine control unit. Common forms of computer readable media include, for example, a floppy disk, a flexible disk, hard disk, magnetic tape, any other magnetic medium, a compact disc read only memory, a digital video disc, any other optical medium, punch cards, paper tape, any other physical medium with patterns of holes, a random access memory, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system, etc. Each such data store is generally included within a computing device employing a computer operating system, such as one of those mentioned above, and are accessed via a network in any one or more of a variety of manners. A file system may be accessible from a computer operating system and may include files stored in various formats. A relational database management system generally employs the Structured Query Language in addition to a language for creating, storing, editing, and executing stored procedures.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A cargo unloader of a vehicle, the cargo unloader comprising:
   a tension-loaded drive mechanism comprising:
      a compressor for increasing the pressure of a fluid;
      a plurality of bladders fluidly connected to the compressor and configured to receive the pressurized fluid from the compressor, with each of the bladders configured to expand in a rearward direction along a longitudinal axis of a cargo bed in response to the associated bladder receiving the fluid from the compressor; and
      a strap system including:
         a plurality of straps attached to each of the bladders; and
         a plurality of spools configured to apply a compression counter force via the straps to the associated bladders in a forward direction opposite to the rearward direction, such that the compression counter force increases the pressure of the fluid in the associated bladders to a predetermined drive pressure threshold, and the spools are further configured to dispense an associated one of the straps at a predetermined stepped payout rate such that the associated bladders expand in the rearward direction to transmit a drive force associated with the predetermined drive pressure threshold; and
   a plow attached to the plurality of bladders and configured to transmit the drive force from the bladders to a cargo positioned in a cargo bed of the vehicle, such that the plow moves the cargo in the rearward direction in response to the bladders expanding in the rearward direction.

2. The cargo unloader of claim 1 further comprising a forward panel assembly for mounting the tension-loaded drive mechanism to a forward end of the cargo bed.

3. The cargo unloader of claim 2 wherein the plow is not attached directly to the cargo bed, and the cargo bed does not have an associated fastener that is capable of being fouled by the cargo.

4. The cargo unloader of claim 1 wherein the plow comprises:
   a primary panel having a forward face attached to the bladders and a rearward face capable of contacting the cargo and moving the cargo in the rearward direction in response to the bladders expanding in the rearward direction; and
   a pair of sub-panels slidably attached to the primary panel and configured to move between a lower position and an upper position to clear a pair of wheel wells when the plow moves in the rearward direction.

5. The cargo unloader of claim 1 further comprising a dead man switch electrically connecting a power supply to the compressor.

6. A tension-loaded drive mechanism for a cargo unloader, the tension-loaded drive mechanism comprising:
   a compressor for increasing the pressure of a fluid;
   a plurality of bladders fluidly connected to the compressor and configured to receive a fluid from the compressor, with each of the bladders configured to expand in a rearward direction along a longitudinal axis of a cargo bed in response to the associated bladder receiving the fluid from the compressor; and
   a strap system including:
      a plurality of straps attached to each of the bladders; and
      a plurality of spools configured to apply a compression counter force via the straps to the associated bladders in a forward direction opposite to the rearward direction, such that the compression counter force increases the pressure of the fluid in the associated bladders to a predetermined drive pressure threshold, and the spools are further configured to dispense an associated one of the straps at a predetermined stepped payout rate such that the associated bladders expand in the rearward direction to transmit a drive force associated with the predetermined drive pressure threshold, with a plow transmitting the drive force from the bladders to a cargo positioned in a cargo bed, such that the plow moves the cargo in the rearward direction in response to the bladders expanding in the rearward direction.

7. The tension-loaded drive mechanism of claim 6 wherein each of the bladders comprises:
   an accordion bellows having a forward end attached to a forward panel assembly mounted to a forward end of the cargo bed, a rear end opposite to the forward end, and a pair of sides extending between the forward and rear ends; and
   a cap having a forward surface attached to the rear end of the accordion bellows, a rear surface attached to a plow for moving a cargo in the rearward direction, and a pair of opposing lateral ends; and
   where at least one of the straps is attached to each of the opposing lateral ends of the cap to transmit the compression counter force to the associated accordion bellows and further to transmit a lateral force to the sides of the accordion bellows in a lateral direction that is transverse to the longitudinal axis of the cargo bed.

8. The tension-loaded drive mechanism of claim 6 wherein each of the bladders further comprises a plurality of guide rings attached to the sides of the accordion bellows and spaced from one another, with each of the guide rings configured to receive the associated strap to block movement of the associated bellows in the lateral direction and apply the compression counter force to the accordion bellows.

9. The tension-loaded drive mechanism of claim 6 wherein each of the spools comprises:
   a spindle for carrying the associated strap; and
   a detent mechanism for applying the compression counter force to the associated strap that in turn applies the compression counter force to the accordion bellows.

10. The tension-loaded drive mechanism of claim 9 wherein the plurality of bladders include at least first and second bladders disposed on opposite sides of the longitudinal axis, and the tension-loaded drive mechanism further comprises:
   a manifold having an inlet fluidly connected to the compressor to receive pressurized fluid from the compressor, the manifold further having first and second outlets fluidly connected to an associated one of the first and second bladders, with the manifold further having first and second solenoid valves attached to an associated one of the first and second outlets, with each of the first and second solenoid valves being movable between an open position to permit a flow of pressurized air to the associated first and second bladders and a closed position to block the flow.

11. The tension-loaded drive mechanism of claim 10 further comprising:
   at least two sensors coupled to the spools for the first and second bladders, with the at least two sensors generating first and second input signals associated with data indicating an angular rotation of the spools and a payout of the associated straps attached to the first and second bladders; and
   a computer having at least one processor electrically communicating with the two sensors, the compressor, and the first and second solenoid valves, and the computer further having a non-transitory computer readable storage medium storing instructions, such that the at least one processor is programmed to:
      determine first and second payout lengths of the straps dispensed by the spools for an associated one of first and second bladders in response to the at least one processor receiving the first and second input signals from an associated one of the two sensors;
      compare the first and second payout lengths to one another;
      transmit a first open actuation signal to the first solenoid valve in response to the at least one processor determining that the second payout length is longer than the first payout length, where the first solenoid valve moves to the open position in response to the first solenoid valve receiving the first open actuation signal from the at least one processor, and where the fluid flows from the first outlet to the first bladder such that the first bladder moves a first side portion of the plow in the rearward direction in response to the first solenoid valve moving to the open position; and
      transmit a second open actuation signal to the second solenoid valve in response to the at least one processor determining that the first payout length is longer than the second payout length, where the second solenoid valve moves to the open position in response to the second solenoid valve receiving the second open actuation signal from the at least one processor, and where the fluid flows from the second outlet to the second bladder such that the second bladder moves a second side portion of the plow in the rearward direction in response to the second solenoid valve moving to the open position.

12. The tension-loaded drive mechanism of claim 11 wherein the at least one processor is further programmed to:
   transmit a first locking actuation signal to a first solenoid pawl associated with the first bladder in response to the at least one processor determining that the first payout length is longer than the second payout length, and the first solenoid pawl moves to the first locked position to prevent rearward movement of the first side portion of the plow in response to the first solenoid pawl receiving the first locking actuation signal; and transmit a second locking actuation signal to a second solenoid pawl associated with the second bladder in response to the at least one processor determining that the second payout length is longer than the first payout length, and the second solenoid pawl moves to the second locked position to prevent rearward movement of the second side portion of the plow in response to the second solenoid pawl receiving the second locking actuation signal.

13. The tension-loaded drive mechanism of claim 11 wherein the at least one processor is further programmed to transmit the first open actuation signal to the first solenoid valve and the second open actuation signal to the second solenoid valve in response to the at least one processor determining that the first and second payout lengths are equal to one another, where the fluid flows from the first and second outlets to an associated one of the first and second bladders in response to the first and second solenoid valves moving to the open position, such that the first and second bladders concurrently move the first and second side portions of the plow in the rearward direction.

14. The tension-loaded drive mechanism of claim 11 wherein the detent mechanism comprises:
a ratchet wheel attached to the spindle and having a plurality of angled teeth, where each of the angled teeth includes a convex top, a side, and a concave root;
at least two solenoid pawls, with each of solenoid pawls being movable between a released position where the associated solenoid pawl is radially spaced from the angled teeth to permit the ratchet wheel to freely rotate, an unlocked position where the associated solenoid pawl is slidable along the side of the associated tooth to permit the ratchet wheel to rotate up to one step, and a locked position where the associated solenoid pawl abuts the concave root of the associated tooth to prevent the ratchet wheel from rotating; and
where the at least two solenoid pawls are angularly spaced from one another about the ratchet wheel such that one of the solenoid pawls is disposed in the unlocked position in response to the other of the solenoid pawl being disposed in the locked position; and
where a step threshold of the predetermined stepped payout rate is associated with a minimum angular rotation of the associated spool from a first rotational position where one of the solenoid pawls is disposed in the locked position to a second first rotational position where the other of the solenoid pawls is disposed in the locked position.

15. The cargo unloader of claim 14 wherein the at least one processor is further programmed to:
compare the angular rotation of the spools to the step threshold in response to the at least one processor receiving the first and second input signals from the two sensors;
identify a complete step payout indicating that one of the solenoid pawls is disposed in the locked position in response to the at least one processor determining that the angular rotation is not less than the step threshold;
compare the angular rotation of the spools to a number of rotations associated with a maximum payout threshold in response to the at least one processor identifying the complete step payout, with the maximum payout threshold being associated with a total length of the strap being deployed from the associated spool;
identify a complete maximum payout where the angular rotation is not less than the number of rotations associated with the maximum payout threshold;

transmit a compressor deactivation signal to the compressor such that the compressor stops pressurizing the fluid in response to the at least one processor identifying the complete maximum payout;
identify an incomplete maximum payout where the angular rotation is less than the number of rotations associated with the maximum payout threshold; and
transmit a compressor actuation signal to the compressor for continuing to further pressurize the fluid in further response to the at least one processor identifying the incomplete maximum payout.

16. The cargo unloader of claim 15 wherein the at least one processor is further programmed to:
identify an incomplete step payout indicating that the solenoid pawls are spaced from the locked position in response to the at least one processor determining that the angular rotation is less than the step threshold;
transmit the compressor actuation signal to the compressor for continuing to further pressurize the fluid in further response to the at least one processor identifying the incomplete step payout;
compare the angular rotation of the spools to the step threshold after continuing to further pressurize the fluid;
identify a second incomplete step payout after continuing to further pressurize the fluid in response to the at least one processor determining that the angular rotation of the spools is less than the step threshold;
transmit the compressor deactivation signal to the compressor in response to the at least one processor identifying the second incomplete step; and
compare the angular rotation of the spools to the number of rotations associated with the maximum payout threshold in response to the at least one processor identifying the complete step payout.

17. The cargo unloader of claim 9 wherein the detent mechanism comprises a brake having an eccentric oblong body configured to engage the strap with a predetermined frictional force, with the predetermined frictional force comprising the compression counter force that is exceeded by the drive force in response to the pressure of the fluid in the associated bladder being at least the predetermined drive pressure threshold.

18. A method of operating a tension-loaded drive mechanism for a cargo unloader, the method comprising:
receiving, using a plurality of bladders fluidly connected to a compressor, a fluid from the compressor;
transmitting, using a plurality of spools and a plurality of straps attached to each of the bladders, a compression counter force via the straps to the associated bladders in a forward direction;
increasing, using the compression counter force, the pressure of the fluid in the associated bladders to a predetermined drive pressure threshold;
dispensing, using the spools, an associated one of the straps at a predetermined stepped payout rate; and
expanding the associated bladders in a rearward direction along a longitudinal axis of a cargo bed and opposite to the forward direction to transmit a drive force that is associated with the predetermined drive pressure threshold; and
transmitting, using a plow attached to the plurality of bladders, the drive force from the bladders to a cargo positioned in the cargo bed, such that the plow moves the cargo in the rearward direction in response to the bladders expanding in the rearward direction.

19. The method of claim 18 further comprising:

transmitting, using at least one of the straps attached to a pair of opposing lateral ends of a cap, the compression counter force to an associated accordion bellows; and transmitting, using at least one of the straps, a lateral force to a side of the associated accordion bellows in a lateral direction that is transverse to the longitudinal axis of the cargo bed.

20. The method of claim 19 further comprising:

carrying, using a spindle of the spool, the associated strap; and transmitting, using a detent mechanism of the spool, the compression counter force to the associated strap that in turn transmits the compression counter force to the accordion bellows.

* * * * *